(12) United States Patent
Omae

(10) Patent No.: US 7,136,086 B2
(45) Date of Patent: Nov. 14, 2006

(54) OPTICAL PRINT HEAD

(75) Inventor: Mitsuhiro Omae, Tottori (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 345 days.

(21) Appl. No.: 10/486,357

(22) PCT Filed: Aug. 8, 2003

(86) PCT No.: PCT/JP02/08148

§ 371 (c)(1),
(2), (4) Date: Feb. 27, 2004

(87) PCT Pub. No.: WO03/020525

PCT Pub. Date: Mar. 13, 2003

(65) Prior Publication Data

US 2004/0233270 A1    Nov. 25, 2004

(30) Foreign Application Priority Data

Aug. 29, 2001   (JP)   ............................ 2001-259934

(51) Int. Cl.
*B41J 2/435*   (2006.01)

(52) U.S. Cl. .................................................. 347/237
(58) Field of Classification Search ................. 347/237
See application file for complete search history.

(56) References Cited

FOREIGN PATENT DOCUMENTS

| JP | 9-277592 | 10/1997 |
|---|---|---|
| JP | 09-277592 | * 10/1997 |
| JP | 10-226102 | 8/1998 |

OTHER PUBLICATIONS

PCT/ISA/210 Japanese Search Report.

* cited by examiner

*Primary Examiner*—Shih-Wen Hsieh
(74) *Attorney, Agent, or Firm*—Arent Fox PLLC

(57) ABSTRACT

A driving IC 1 having n output terminals for outputting drive currents to the individual electrodes of a light emitting element (22), and a selecting IC 2 having every n/m output terminals for every m groups with respect to the common electrode of the light emitting element (22) are respectively provided on the opposite sides of the light emitting element (22) with one-to-one correspondence with respect to the element (22).

14 Claims, 20 Drawing Sheets

OPTICAL PRINT HEAD

TECHNICAL FIELD

The present invention relates to an optical print head for use as a recording head in a xerographic printer or the like, and more particularly to an optical print head that employs a driver IC for driving a light-emitting device that is so designed as to permit time-division driving within the device.

BACKGROUND ART

As disclosed in Japanese Utility Model Application Laid-Open No. H6-48887, a light-emitting device (array) used in a conventional optical print head has individual electrodes formed on the top surface of the device so as to correspond one-to-one to a plurality of light-emitting sections, and has a common electrode, i.e., an electrode common to all the light-emitting sections, formed on the back surface of the device. This makes it impossible to drive the device on a time-division basis within the device. Since time-division driving is impossible, it is necessary to provide as many individual electrodes as there are light-emitting sections. Thus, as the light-emitting sections are arranged with increasingly high density, the individual electrodes need to be arranged with accordingly high density. This makes it difficult to connect the light-emitting device to its driving IC.

To solve this problem, Japanese Patent Application Laid-Open No. H6-163980 proposes a light-emitting device that permits time-division driving within the device. Specifically, in this light-emitting device, the light-emitting sections formed on it are divided into m groups, and a plurality of common electrodes are provided, with each of them connected to all the light-emitting sections belonging to one group. Moreover, n individual electrodes are provided, with each of them connected to m light-emitting sections belonging to different groups. Thus, this light-emitting device has m×n light-emitting sections. With this light-emitting device, selecting one of the m common electrodes on a time-division basis makes it possible reduce the number of individual electrodes to 1/m of the number conventionally required. This makes it easy to connect the light-emitting device to its driving IC.

FIG. 21 shows an example of the circuit configuration assumed on the basis of the conventional dynamic driving method in a case where a light-emitting device ready for time-division driving as proposed in the aforementioned publication is used. In FIG. 21, each light-emitting device 100 has a plurality of light-emitting sections formed on its top surface, and those light-emitting sections are divided into two groups. Two common electrodes are each connected to all the light-emitting sections belonging to one of the so divided groups. Moreover, on a one-to-one basis, each light-emitting device 100 is connected by wire bonding to a driving IC 200 having the same number of terminals as there are individual electrodes in the light-emitting device. All light-emitting devices 100 are connected by way of two ground lines 400 to a common electrode selecting IC 300 for choosing between the two common electrodes.

On the other hand, in Japanese Patent Application Laid-Open No. 2001-113751, the applicants of the present invention proposed a versatile driving IC suitable for time-division driving. According to this publication, a driving IC incorporates a first drive section that feeds a current to individual electrodes and a second drive section that selects one of common electrodes at a time on a time-division basis.

In the drive IC configured in this way, the second drive section is provided with a plurality of output terminals that are connected individually to the common terminals, and this helps distribute the current that flows through the drive IC.

However, with the configuration shown in FIG. 21, dividing the light-emitting sections of each light-emitting device into four or more groups necessitates many conductors to electrically connect its common electrodes to the common electrode selecting IC. The differences in resistance among those conductors cause differences in brightness among the light-emitting sections depending on their position. Moreover, a voltage drop or a rise in the ground potential resulting from the internal resistance present near the terminals provided in the common electrode selecting IC adversely affects the brightness of the individual light-emitting sections when they are lit. This causes the brightness of the light-emitting sections to differ according to the number of light-emitting sections lit.

On the other hand, with the configuration proposed in Japanese Patent Application Laid-Open No. 2001-113751, a light-emitting device and the corresponding driving IC are connected together at one side thereof This makes it impossible to reduce the wiring density below a certain limit and thus to increase the number of conductors connecting to common electrodes. FIGS. 22 and 23 are each a wiring diagram of part of this configuration.

In FIGS. 22 and 23, every four light-emitting sections 126 have their anodes connected together to one individual electrode 128, and the four light-emitting sections 126 forming each group have their cathodes connected, individually by way of contact holes 125, each to one of conductors 127-1 to 127-4, which serve as common electrodes. One of the four light-emitting sections 126 that connect by way of a contact hole 128 to the output terminal DOa of the first drive section is connected to the output terminal CD1 of the second drive section. This output terminal CD1 is connected by way of the contact hole 129 to the conductor 127-1. The other three of the four light-emitting sections 126 that connect by way of the contact hole 128 to the output terminal DOa of the first drive section are connected each to one of the conductors 127-2 to 127-4, which serve as the common electrodes.

Moreover, one of the four light-emitting sections 126 that connect by way of a contact hole 128 to the output terminal DOb of the first drive section is connected to the output terminal CD2 of the second drive section. This output terminal CD2 is connected by way of the contact hole 129 to the conductor 127-2. The other three of the four light-emitting sections 126 that connect by way of the contact hole 128 to the output terminal DOb of the first drive section are connected each to one of the conductors 127-1, 127-3, and 127-4, which serve as the common electrodes. Furthermore, one of the four light-emitting sections 126 that connect to each of the individual electrodes 128 connected to the output terminals DOc and DOd of the first drive section is connected to one of the output terminals CD3 and CD4 of the second drive section in similar manners. Between FIGS. 22 and 23, the positions at which the contact holes 128 and 125 are formed are reversed. In this way, this configuration requires complicated wiring.

Moreover, the second drive section, which functions as a common electrode selector, generates a large amount of heat, which may cause variation in the output characteristics of the driving IC or otherwise have adverse effects, resulting in large variation in the drive current output from the first drive section. This problem has particularly serious consequences in a case where a large current is fed to a light-emitting device in an optical print head or the like for use in a high-speed, high-resolution printer.

An object of the present invention is to provide an optical print head that operates with smaller differences in brightness among the individual light-emitting sections and with less effects of the heat generated to feed a voltage to the common electrodes on the drive current fed to the individual electrodes.

DISCLOSURE OF THE INVENTION

To achieve the above object, according claim 1, an optical print head is provided with: a light-emitting device that has m groups of n light-emitting sections so as to permit time-division driving and that is arrayed in one row on a substrate; a driving IC that has n device driving output terminals to feed drive currents via the device driving output terminals to first electrodes of the light-emitting sections and that is arrayed in one row on the substrate; and a selecting IC that has x×m group selection terminals of which x are provided for each group of light-emitting sections to feed a supply potential via the group selection terminals to second electrodes of the light-emitting sections and that is arrayed in one row on the substrate. Here, the driving IC and the selecting IC are arranged in a pair with the light-emitting device placed in between. Moreover, time-division driving is achieved in the following manner: while the driving IC feeds the drive currents to the light-emitting device in such a way that the light-emitting sections belonging to one group at a time receive their respective drive currents according to n data signals corresponding to those light-emitting sections, the selecting IC feeds the supply potential to the light-emitting device in such a way that the light-emitting sections belonging to one group at a time receive the supply potential.

With this configuration, it is possible to avoid complicating the wiring for connecting the second electrodes of the light-emitting sections provided in the light-emitting device, and thereby to reduce the current capacity resulting from lengthy conductors.

BEST MODE FOR CARRYING OUT THE INVENTION

Hereinafter, embodiments of the present invention will be described with reference to the drawings.

Figure 1:
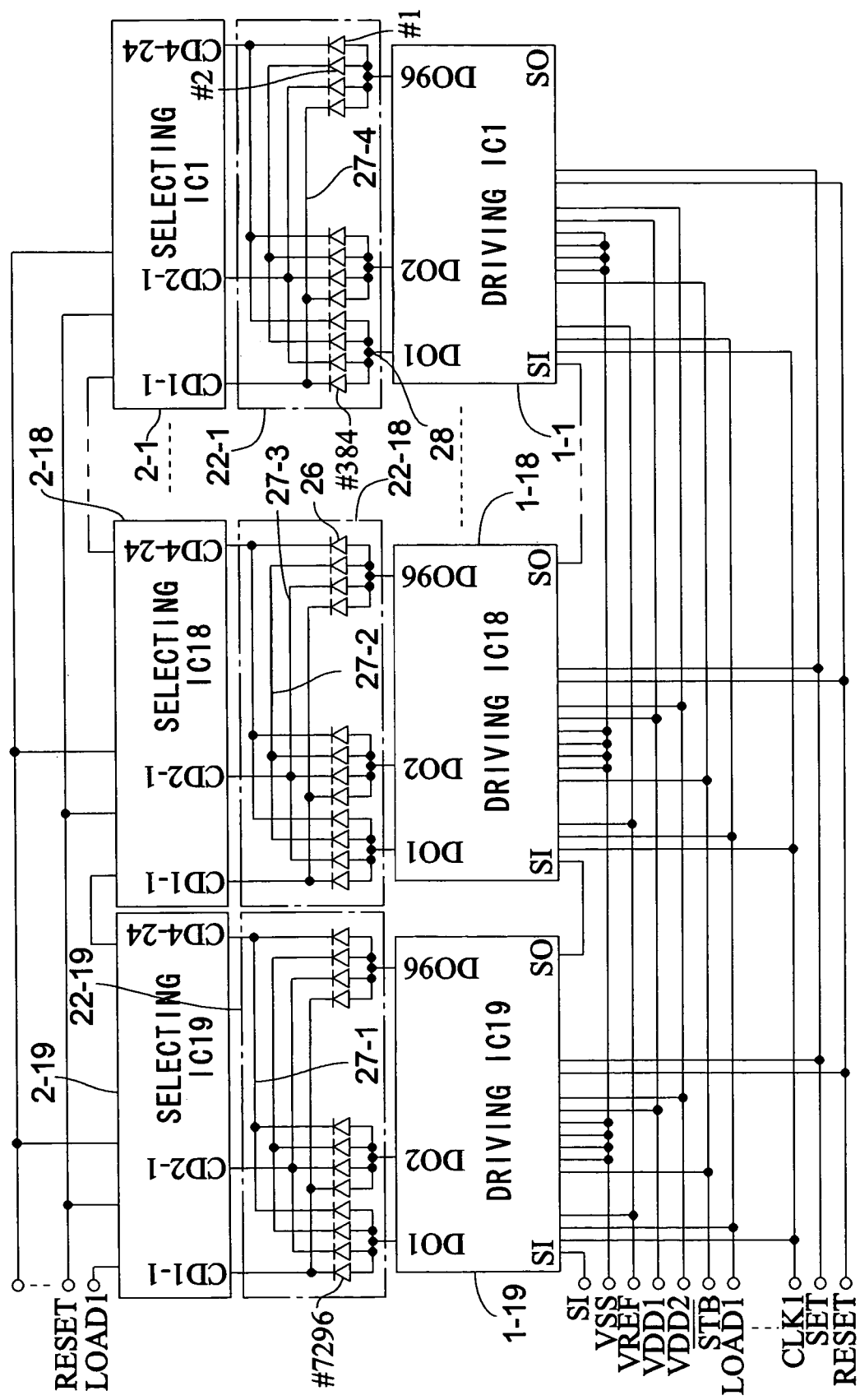
FIG. 1 is a block diagram showing the internal configuration of an optical print head embodying the invention.

First, the configuration of an optical print head embodying the invention will be described with reference to FIG. 1. In the optical print head shown in FIG. 1, there are provided L (19) light-emitting devices 22 each provided with n×m (384) light-emitting sections 26, and, in a one-to-one correspondence with those light-emitting devices 22, there are provided L (19) driving ICs 1 and L (19) common electrode selecting ICs (hereinafter referred to as the "selecting ICs") 2.

The light-emitting devices 22-1, 22-2, . . . , and 22-19 are each provided with light-emitting sections #1 to #384, #385 to #768, . . . , and #6913 to #7296. The driving ICs 1-1 to 1-19 are each provided with n (96) output terminals DO1 to DO96, and the selecting ICs 2-1 to 2-19 are each provided with n (96) output terminals CD1-1 to CD1-24, CD2-1 top CD2-24, CD3-1 to CD3-24, and CD4-1 to CD4-24.

Here, the light-emitting devices 22-1 to 22-19 are all configured in the same manner, the driving ICs 1-1 to 1-19 are all configured in the same manner, and the selecting ICs 2-1 to 2-19 are all configured in the same manner. Accordingly, in the following descriptions, the interrelationship among these components will be described with respect only to the light-emitting device 22-1, the driving IC 1-1, and the selecting IC 2-1 as the representative of each kind. The light-emitting device 22-1 has individual electrodes 28 provided one for every m (4) of its light-emitting sections, i.e., one for each of the groups of light-emitting sections #1 to #4, #5 to #8, . . . , and #381 to #384. These individual electrodes 28 are connected respectively to the output terminals DO1 to DO96 of the driving IC 1-1.

The light-emitting device 22-1 is provided also with common electrodes 27-1 to 27-4, with the common electrode 27-1 connected to the light-emitting sections #1, #5, . . . , and #381, the common electrode 27-2 connected to the light-emitting sections #2, #6, . . . , and #382, the common electrode 27-3 connected to the light-emitting sections #3, #7, . . . , and #383, and the common electrode 27-4 connected to the light-emitting sections #4, #8, . . . , and #384. The common electrode 27-4 is connected to the output terminals CD1-1 to CD1-24 of the selecting IC 2-1, the common electrode 27-3 is connected to the output terminals CD2-1 to CD2-24 of the selecting IC 2-1, the common electrode 27-2 is connected to the output terminals CD3-1 to CD3-24 of the selecting IC 2-1, and the common electrode 27-1 is connected to the output terminals CD4-1 to CD4-24 of the selecting IC 2-1.

Figure 2:
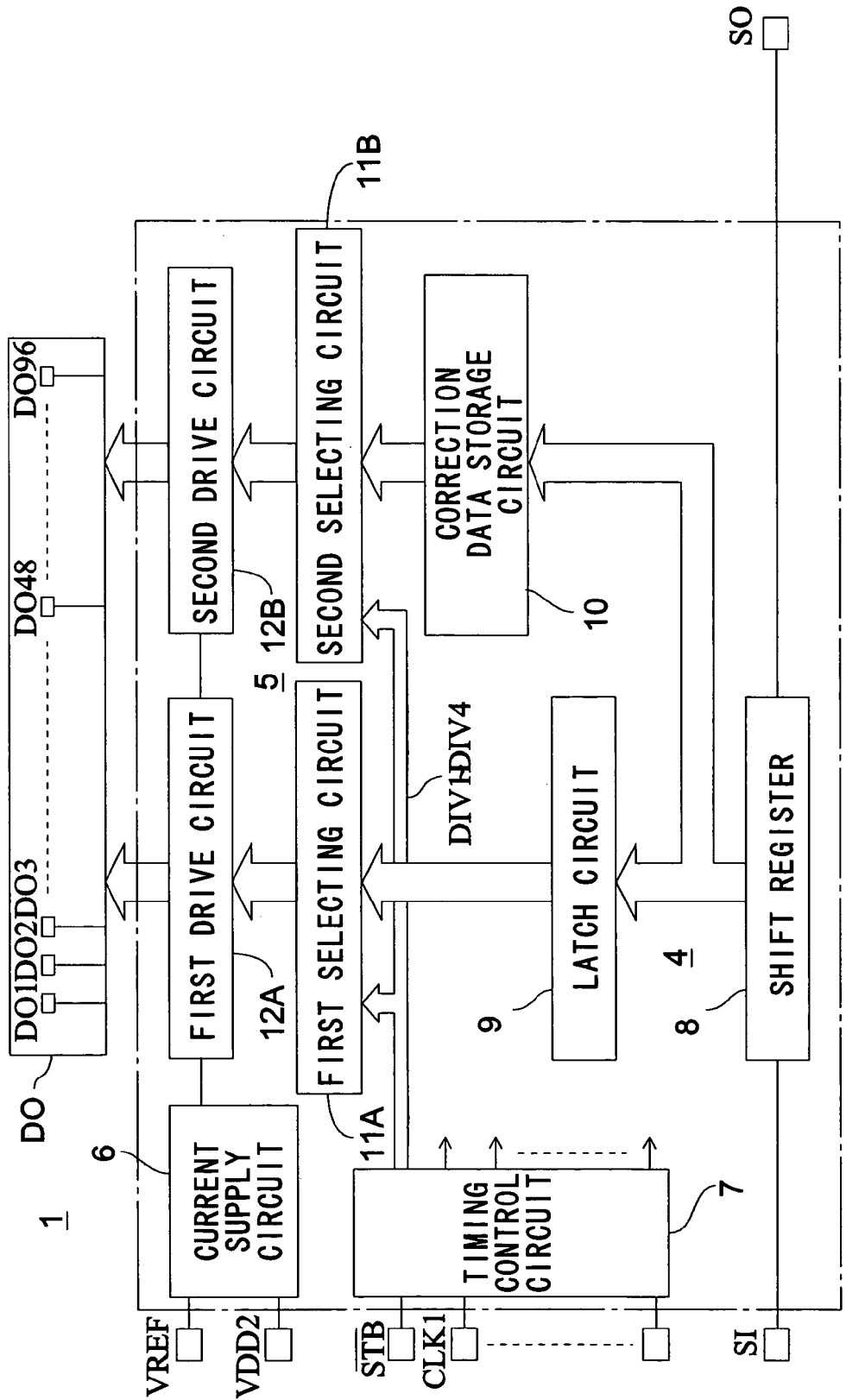
FIG. 2 is a block diagram showing the internal configuration of the driving IC provided in an optical print head embodying the invention.
Figure 3:
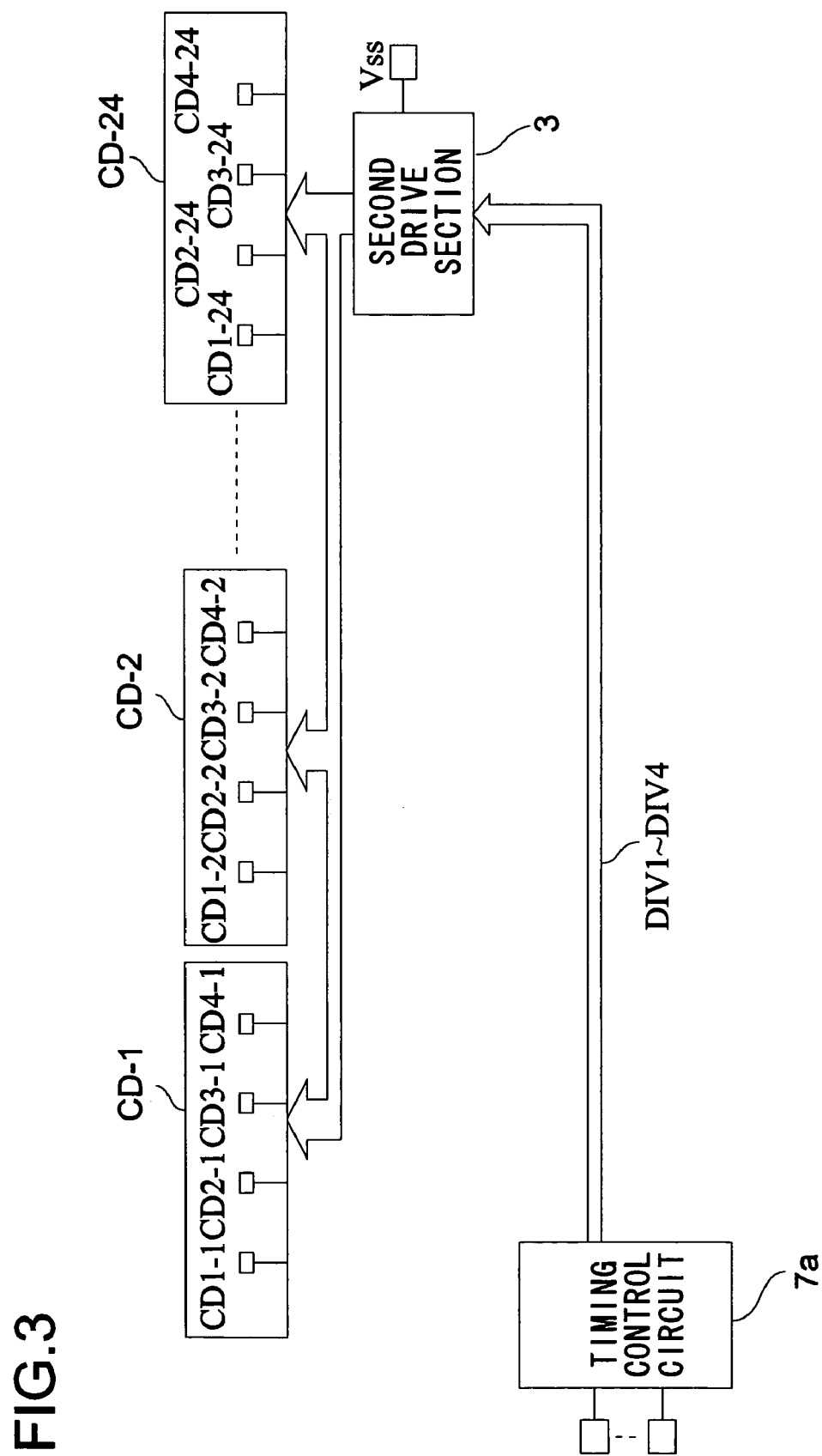
FIG. 3 is a block diagram showing the internal configuration of the selecting IC provided in an optical print head embodying the invention.

Now, with reference to FIGS. 2 and 3, a brief description will be given of the internal configuration of the driving IC 1 and the selecting IC2 used in the optical print head configured as described above. Their configuration and operation will be described in more detail later in the description of each embodiment of the invention.

First, with reference to FIG. 2, the configuration of the driving IC 1 will be described. As shown in FIG. 2, the driving IC 1 is provided with an individual terminal section DO composed of n (96) output terminals DO1 to DO96 for driving the light-emitting device (for the individual electrodes 23a); a data signal storage circuit 4 that temporarily stores serial input data signals fed in sequentially via a data input terminal SI; a drive circuit 5 that outputs drive signals individually via the output terminals DO1 to DO96 on the basis of the data signals fed thereto at a plurality of times from the data signal storage circuit 4; a current feed circuit 6 that feeds a constant current to the drive circuit 5; and a timing control circuit 7 that produces predetermined timing signals.

The data signal storage circuit 4 is provided with a shift register 8 of an n×m (384) bit type that takes in the data signals serially fed in via the data input terminal SI in synchronism with a clock signal CLK1 and that then outputs them via a data output terminal SO; and a latch circuit 9 of an n×m (384) bit type that takes in, parallelly in synchronism with a load signal LOAD1, the data signals taken in by the shift register 8. The n×m (384) data signals output parallelly from the shift register 8 can be fed to a correction data storage circuit 10 without being passed through the latch circuit 9.

In a case where, for example, the data signals each consist of a plurality of bits, the shift register 8 and the latch circuit 9 may be configured accordingly. For example, the shift register 8 may be configured as a memory of which different portions are specified by addresses.

The drive circuit 5 is provided with, as its main blocks, a first selecting circuit 11A that sequentially selects and outputs, in groups of n, the n×m (384) data signals output from the latch circuit 9, and a first drive circuit 12A of an n (96) bit type that outputs a predetermined current via the output terminals DO1 to DO96 on the basis of the outputs of the first selecting circuit 11A. As required, in addition to these main blocks, the drive circuit 5 is further provided with a correction data storage circuit 10 for storing n×m (384) correction data signals to achieve output correction, a second selecting circuit 11B, for correction data, that sequentially selects and outputs, in groups of n, the n×m (384) correction data signals output from the correction data storage circuit 10, and a second drive circuit 12B, for correction data, that outputs, as driving signals via the output terminals DO1 to DO96, current outputs of which the current is adjusted on the basis of the outputs from the second selecting circuit 11B. The selecting circuits 11A and 11B each operate in synchronism with division timing signals (DIV1 to DIV4) fed from the timing control circuit 7.

In the storage circuit 10 are stored correction data signals that have previously been determined for the purpose of correcting the amounts of light emitted by the individual light-emitting sections 26 to make them uniform. The storage circuit 10 is configured as, for example, a latch circuit of an S×n×m bit type so that it can store n×m (384) correction data signals each consisting of S bits (for example, 3 bits). The writing of correction data signals to the correction data storage circuit 10 is achieved on the basis of the signals fed parallel, in groups of n×m (384), from the shift register 8.

The writing of correction data signals to the correction data storage circuit 10 can be performed in advance. Specifically, it can be achieved, with the storage circuit 10 alone brought into a write enable state, by writing one bit of each correction data signal thereto through the shift register 8 and repeating this operation S (3) times.

Next, with reference to FIG. 3, the configuration of the selecting IC 2 will be described. As shown in FIG. 3, the selecting IC 2 is provided with n/m (24) common terminal sections CD-1 to CD-24 each composed of m (4) output terminals CD1-1 to CD4-1, CD1-2 to CD4-2, . . . , or CD1-24 to CD4-24 for group selection (for the common electrodes 27-1 to 27-4); a drive circuit 3 that is connected to the output terminals CD1-1 to CD4-1, CD1-2 to CD4-2, . . . , and CD1-24 to CD4-24 so as to switch the potentials at them selectively to one of the supply potentials, for example to the ground potential VSS; and a timing control circuit 7a that feeds predetermined timing signals to the drive circuit 3. The drive circuit 3 operates in synchronism with division timing signals (DIV1 to DIV4) fed from the timing control circuit 7a.

Figure 4:
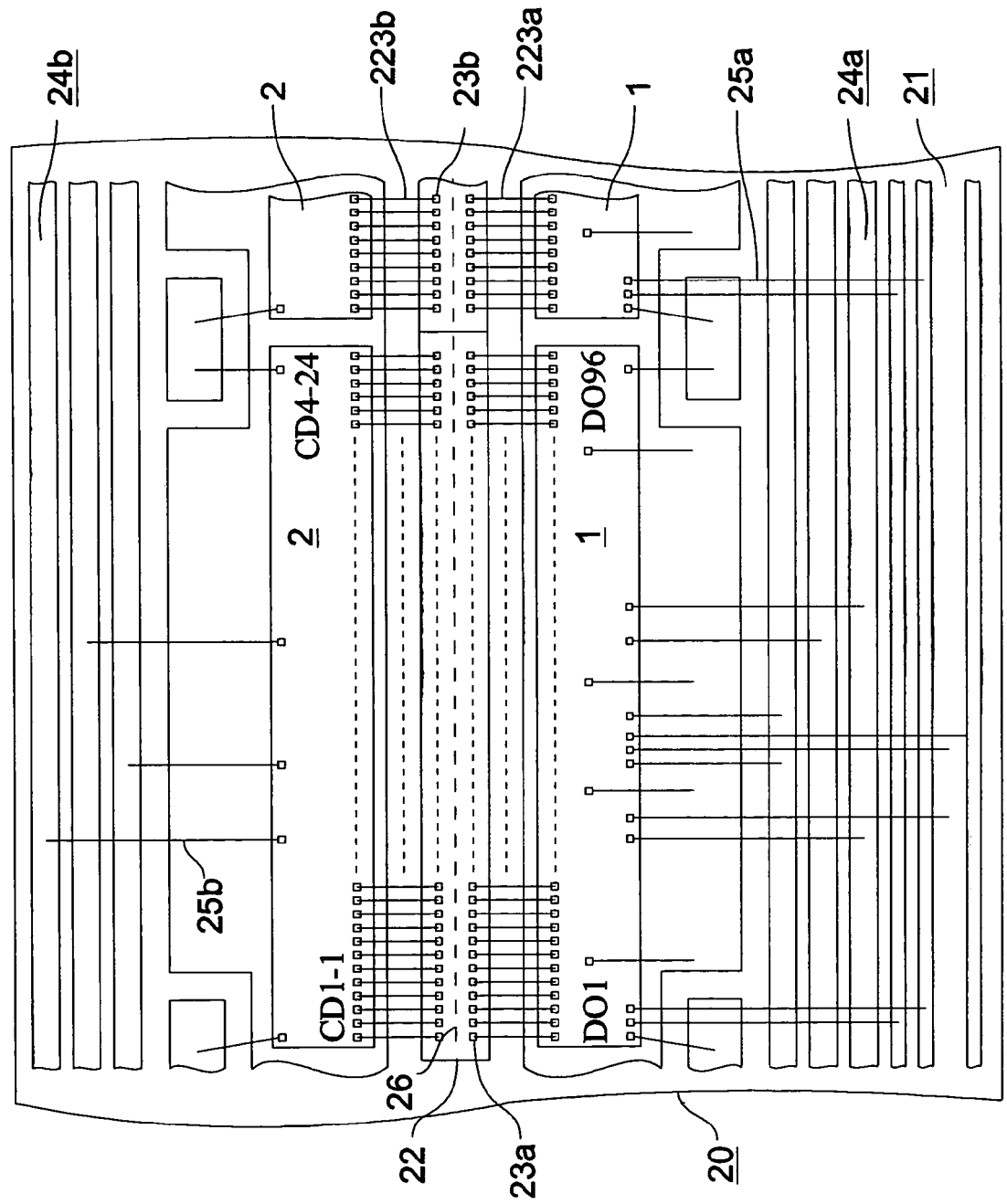
FIG. 4 is a plan view of a principal portion of an optical print head embodying the invention.

Now, the outer appearance of the optical print head configured as described above will be described with reference to FIG. 4. FIG. 4 is a plan view of a principal portion of a practical example of the optical print head 20. In the optical print head 20 shown in FIG. 4, on an insulating substrate 21, there are arrayed L (19) light-emitting devices 22 in one row, and, in a one-to-one correspondence with those light-emitting devices 22, there are arrayed driving ICs 1 in one row, adjacent to and on one side of the light-emitting devices 22, and common electrode selecting ICs 2 in one row, adjacent to and on the other side of the light-emitting devices 22. That is, in FIG. 4, the common electrode selecting ICs 2 are arranged above the light-emitting devices 22 and the driving ICs 1 are arranged below the light-emitting devices 22 in such a way as to show a one-to-one-to-one correspondence.

Between the light-emitting devices 22 and the driving ICs 1, there are strung wires 223a that connect them together. Between the light-emitting devices 22 and the common electrode selecting ICs 2, there are strung wires 223b that connect them together. As the wires 223a and 223b, it is possible to use a direct connecting structure composed of wire-bonded wires such as gold wires, or an indirect connecting structure composed of wire-bonded wires relayed with relay patterns, or even a structure composed of high-density flexible wires bonded with an anisotropic conductive adhesive.

On the substrate 21, there are formed a plurality of signal- and power-feeding conductor patterns 24a and 24b in the direction in which the light-emitting devices 22 are arrayed. Between the driving ICs 1 and the conductor pattern 24a, there are strung wires 25a similar to the wires 223a. Between the common electrode selecting ICs 2 and the conductor pattern 24b, there are strung wires 25b similar to the wires 223b.

On the top surface of each light-emitting device 22, there are arrayed m×n (384) light-emitting sections 26 along the longer sides. These light-emitting sections 26 are formed independently of one another so as to permit time-division driving, and are divided into m (4) groups so that they can be driven group by group on a time-division basis. In this example, the light-emitting sections 26 are divided into four groups according to the remainder obtained when their number of arrangement is divided by four; specifically, of the light-emitting sections 26, the first, fifth, ninth, . . . belong to the first group, the second, sixth, tenth, . . . belong to the second group, the third, seventh, eleventh, . . . belong to the third group, and the fourth, eighth, twelfth, . . . belong to the fourth group.

Moreover, the light-emitting device 22 is provided with, for every n/m (24) light-emitting sections, four common electrodes, namely a common electrode 27-1 that is connected to all the light-emitting sections 26 belonging to the first group, a common electrode 27-2 that is connected to all the light-emitting sections 26 belonging to the second group, a common electrode 27-3 that is connected to all the light-emitting sections 26 belonging to the third group, and a common electrode 27-4 that is connected to all the light-emitting sections 26 belonging to the fourth group. In FIG. 4, there are provided n (96) common electrodes 23b. Moreover, there are provided n (96) individual electrodes 23a each connected to four consecutive light-emitting sections 26.

The individual electrodes 23a are connected respectively to the output terminals DO1 to DO96 of the driving IC 1, and the common electrodes 23b are connected respectively to the output terminals CD1-1 to CD1-24, CD2-1 to CD2-24, CD3-1 to CD3-24, and CD4-1 to CD4-24. By selecting one of the common electrodes 23b at a time and energizing one of the individual electrodes 23a at a time, it is possible to light a quarter of the light-emitting sections 26 at a time. Since there are provided L (19) light-emitting devices 22 in total, the head 20 as a while has L×m×n=19×4×96=7,296 light-emitting sections 26.

Figure 5:
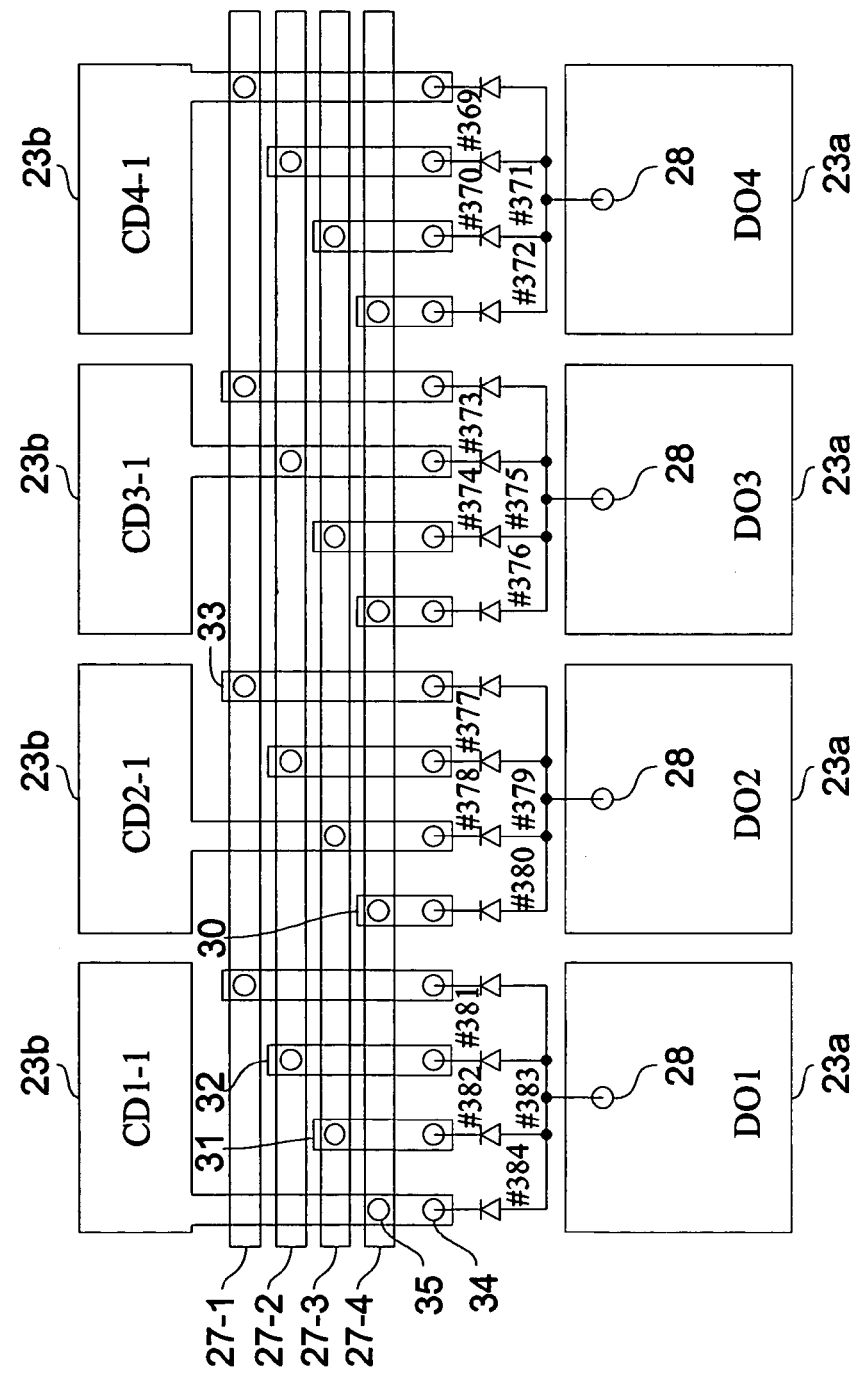
FIG. 5 is a plan view of a principal portion of the light-emitting device used in an optical print head embodying the invention.

Now, with reference to FIG. 5, the interconnection will be described. FIG. 5 is a plan view of a principal portion around some of the light-emitting sections 26 of the light-emitting device 22. In the following description, the portion around the light-emitting sections #369 to #384 will be taken up as a representative. The light-emitting sections #381 to #384 have their anodes electrically connected, by way of a contact hole 28, a wiring pad 23a, and a wire 223a (FIG. 4), to the output terminal DO1; the light-emitting sections #377 to #380 have their anodes electrically connected, by way of a contact hole 28, a wiring pad 23a, and a wire 223a (FIG. 4), to the output terminal DO2; the light-emitting sections #373 to #376 have their anodes electrically connected, by way of a contact hole 28, a wiring pad 23a, and a wire 223a (FIG. 4), to the output terminal DO3; and the light-emitting sections #369 to #372 have their anodes electrically connected, by way of a contact hole 28, a wiring pad 23a, and a wire 223a (FIG. 4), to the output terminal DO4.

On the other hand, the common electrode 27-4 is electrically connected, by way of a contact hole 35, a wiring pad 23b, and a wire 223b (FIG. 4), to the output terminal CD1-1; the common electrode 27-3 is electrically connected, by way of a contact hole 35, a wiring pad 23b, and a wire 223b (FIG. 4), to the output terminal CD2-1; the common electrode 27-2 is electrically connected, by way of a contact hole 35, a wiring pad 23b, and a wire 223b (FIG. 4), to the output terminal CD3-1; and the common electrode 27-1 is electrically connected, by way of a contact hole 35, a wiring pad 23b, and a wire 223b (FIG. 4), to the output terminal CD4-1.

Furthermore, the light-emitting section #384 has its cathode electrically connected to a contact hole 34, the contact hole 35, the wiring pad 23b, and the common electrode 27-4; the light-emitting section #379 has its cathode electrically connected to a contact hole 34, the contact hole 35, the wiring pad 23b, and the common electrode 27-3; the light-emitting section #374 has its cathode electrically connected to a contact hole 34, the contact hole 35, the wiring pad 23b, and the common electrode 27-2; and the light-emitting section #369 has its cathode electrically connected to a contact hole 34, the contact hole 35, the wiring pad 23b, and the common electrode 27-1.

Moreover, the light-emitting sections #372, #376, and #380 have their cathodes electrically connected, by way of the contact holes 34 and 35 and a wiring pattern 30, to the common electrode 27-4; the light-emitting sections #371, #375, and #383 have their cathodes electrically connected, by way of the contact holes 34 and 35 and a wiring pattern 31, to the common electrode 27-3; the light-emitting sections #370, #378, and #382 have their cathodes electrically connected, by way of the contact holes 34 and 35 and a wiring pattern 32, to the common electrode 27-2; and the light-emitting sections #373, #377, and #381 have their cathodes electrically connected, by way of the contact holes 34 and 35 and a wiring pattern 33, to the common electrode 27-1.

The configuration described above is common to the first to third embodiments of the invention described below. Hereinafter, with respect to each of those embodiments, more detailed descriptions will be given of the configuration of the driving IC and the selecting IC and the operation of the optical print head.

First Embodiment

Figure 6:
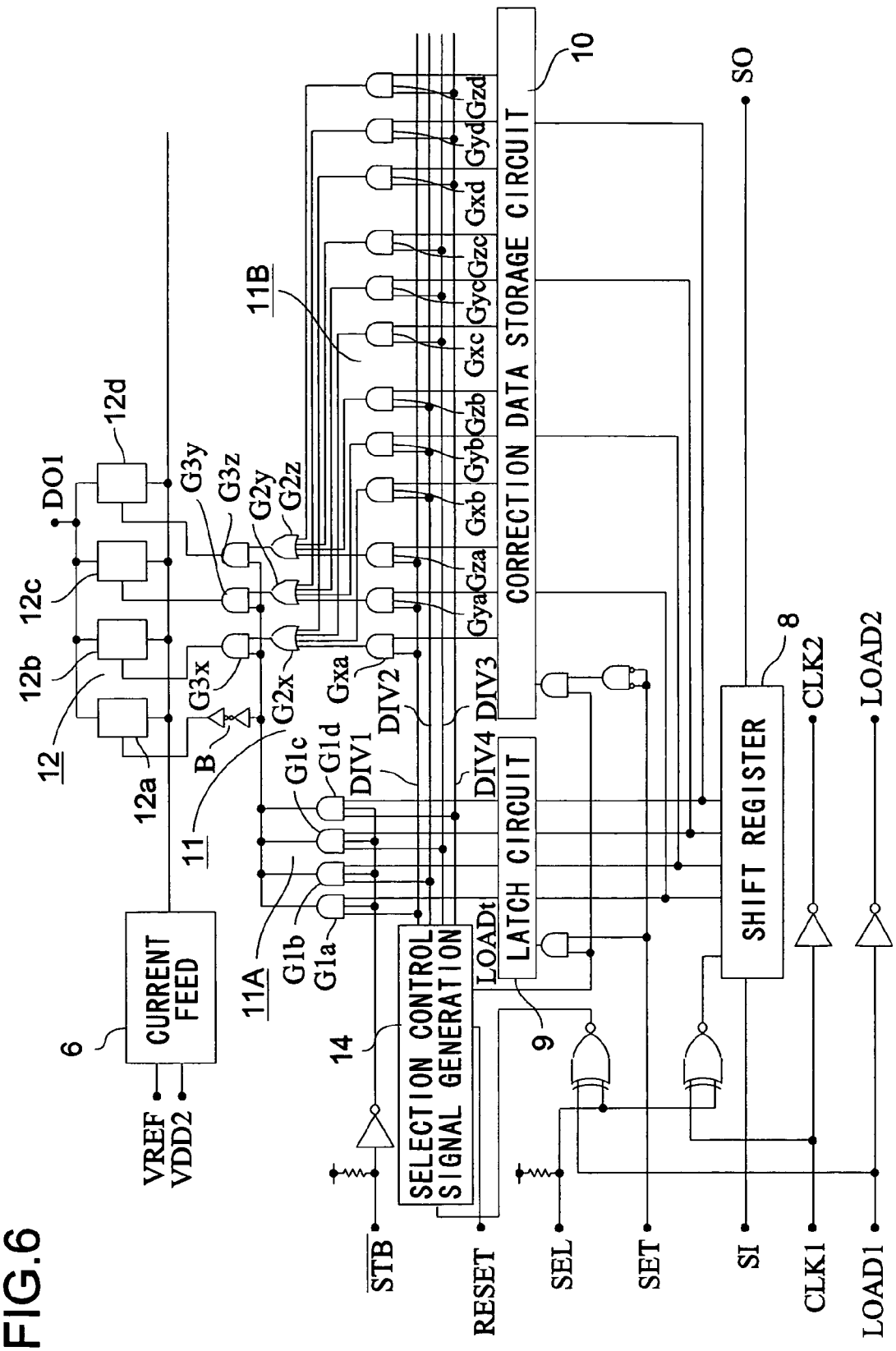
FIG. 6 is a block circuit diagram showing the internal configuration of the driving IC provided in the optical print head of a first embodiment of the invention.
Figure 9:
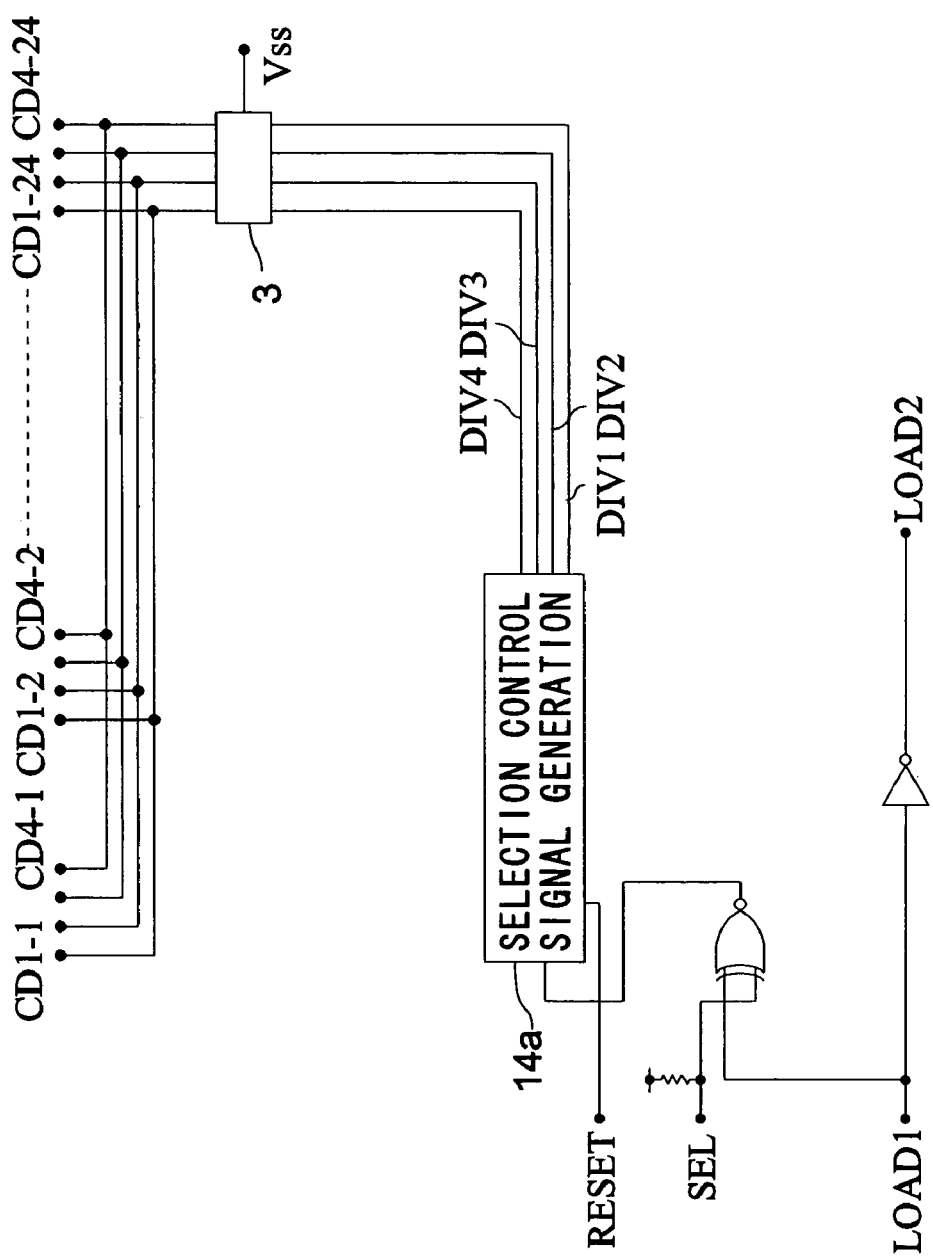
FIG. 9 is a block circuit diagram showing the internal configuration of the selecting IC provided in the optical print head of the first embodiment

A first embodiment of the optical print head configured as described above will be described with reference to the drawings. FIG. 6 is a circuit block diagram of a principal portion of the driving IC relating primarily to one DO1 of the output terminals DO1 to DO96 as extracted from the block diagram shown in FIG. 2. FIG. 9 is a circuit block diagram of a principal portion of the selecting IC as a more detailed version of the block diagram shown in FIG. 3.

First, the driving IC 1 will be described. In the driving IC 1 shown in FIG. 6, suppose that drive currents are fed from the output terminal DO1 for light-emitting sections #a to #d. Then, the data signals for the light-emitting sections #a to #d are fed from the shift register 8 to the latch circuit 9 and then to the selecting circuit 11A. The latch circuit 9 takes in, in synchronism with a load signal LOADt output from a selection control signal generation circuit 14, the data signals taken in by the shift register 8.

The selecting circuit 11A is composed of three-input AND gates G1a to G1d, which respectively receive the data signals for the light-emitting sections #a to #d from the latch circuit 9. The AND gates G1a to G1d also respectively receive m (4) division timing signals DIV1 to DIV4 fed from the selection control signal generation circuit 14, and they all receive, as the third input, a strobe signal STB.

In the correction data storage circuit 10 are stored correction data signals, in sets of S (3) bits, that have previously been fed thereto through the shift register 8. The S (3) bit correction data signals for the light-emitting section #a are fed to two-input AND gates Gxa to Gza, the S (3) bit correction data signals for the light-emitting section #b are fed to two-input AND gates Gxb to Gzb, the S (3) bit correction data signals for the light-emitting section #c are fed to two-input AND gates Gxc to Gzc, and the S (3) bit correction data signals for the light-emitting section #d are fed to two-input AND gates Gxd to Gzd.

The AND gates Gxa to Gza receive, as the other input, the division timing signal DIV1, the AND gates Gxb to Gzb receive, as the other input, the division timing signal DIV2, the AND gates Gxc to Gzc receive, as the other input, the division timing signal DIV3, and the AND gates Gxd to Gzd receive, as the other input, the division timing signal DIV4. The outputs of the AND gates Gxa to Gxd are fed to a four-input OR gate G2x, the outputs of the AND gates Gya to Gyd are fed to a four-input OR gate G2y, and the outputs of the AND gates Gza to Gzd are fed to a four-input OR gate G2z.

The output from the AND gates G1a to G1d is fed to a buffer B; the output from the AND gates G1a to G1d and the output of the OR gate G2x are fed to a two-input AND gate G3x; the output from the AND gates G1a to G1d and the output of the OR gate G2y are fed to a two-input AND gate G3y; and the output from the AND gates G1a to G1d and the output of the OR gate G2z are fed to a two-input AND gate G3z.

The drive circuit 12 is composed of, for one output terminal DO1, four current amplifiers 12a to 12d that output different currents, and these current amplifiers 12a to 12d receive a current from the current feed circuit 6. The operation states of the current amplifiers 12a to 12d are controlled independently by the outputs from the buffer B and from the AND gates G3x to G3z so that their total output current can be varied around 4 mA, in the range from about 3 mA to 5 mA.

Figure 7:
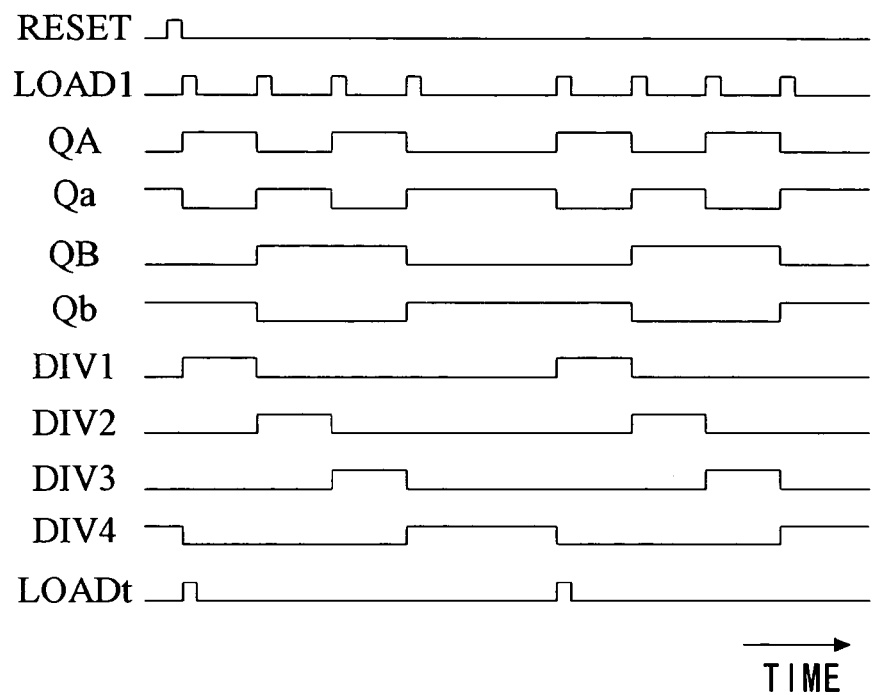
FIG. 7 is a timing chart showing the operation of the selection control signal generating circuit provided in the optical print head of the first embodiment.
Figure 8:
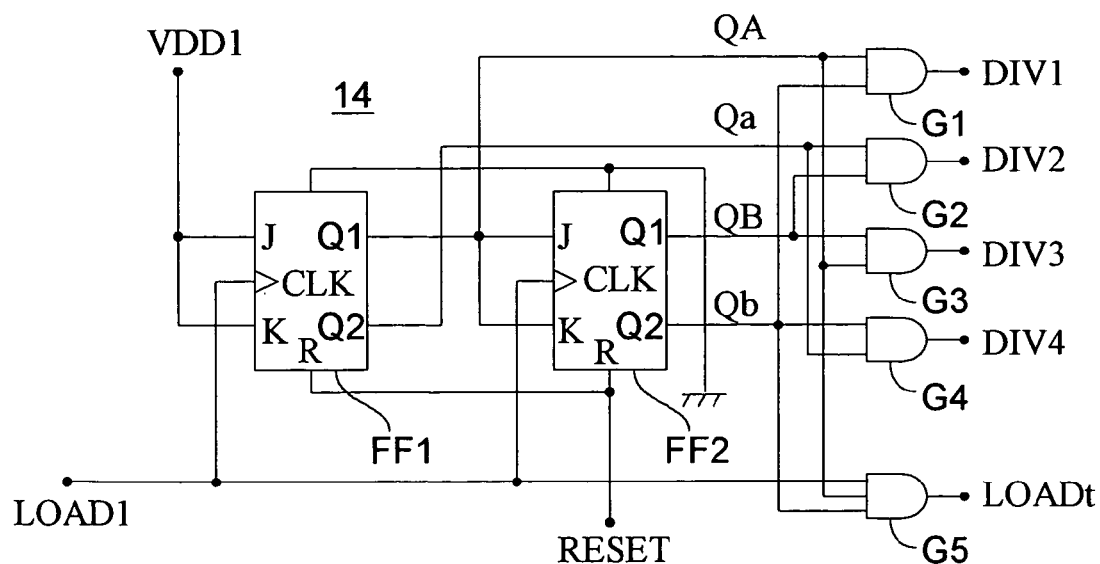
FIG. 8 is a block circuit diagram showing the internal configuration of the selection control signal generating circuit provided in the optical print head of the first embodiment.

The selection control signal generation circuit 14 is, as FIG. 7 shows the waveforms relevant thereto, a circuit that generates the division timing signals DV1 to DIV4 for dividing the period determined by the load signal LOADt, which indicates the storage timing, into a plurality of period. The selection control signal generation circuit 14 can be built, for example as shown in FIG. 8, with a counter composed of two flip-flops FF1 and FF2 and m (4) logic gate circuits G1 to G4 plus one logic gate circuit G5. The logic gate circuit G5 is used to separate the load signal LOADt. Here, the control signal LOAD1 is a signal that has the division timing signals DIV1 to DIV4 superimposed on the load signal LOADt, which determines the latch timing of the latch circuit 9, and that is fed in from outside by way of a signal line separate from that by way of which the strobe signal STB, which determines the lighting time, is fed in.

Specifically, the JK flip-flop FF1 receives a supply voltage VDD1, which is at a high level, at its input terminals J and K, receives the control signal LOAD1 at its clock input terminal CL, and receives a reset signal RESET at its reset input terminal R. The flip-flop FF1 outputs a signal QA at its output terminal Q1, and outputs a signal Qa at its output terminal Q2. The JK flip-flop FF2 receives the signal QA at its input terminals J and K, receives the control signal LOAD1 at its clock input terminal CL, and receives the reset signal RESET at its reset input terminal R.

The flip-flop FF2 outputs a signal QB at its output terminal Q1, and outputs a signal Qb at its output terminal Q2. The logic gate circuit G1 outputs the AND of the signals QA and Qb as the division timing signal DIV1. The logic gate circuit G2 outputs the AND of the signals Qa and QB as the division timing signal DIV2. The logic gate circuit G3 outputs the AND of the signals QA and QB as the division timing signal DIV3. The logic gate circuit G4 outputs the AND of the signals Qa and Qb as the division timing signal DIV4. The logic gate circuit G5 outputs the AND of the control signal LOAD1 and the signals QA and Qb as the load signal LOADt.

In FIG. 8, the selection control signal generation circuit 14 is so configured as to be reset by the reset signal RESET fed from outside. However, the selection control signal generation circuit 14 may be reset in synchronism with the input of the data signals corresponding to one line. For example, it may be so configured that the flip-flops FF1 and FF2 are reset by a signal synchronous with the load signal LOADt.

With the relevant circuits configured as described above, with respect to the output terminal DO1, data flows in the following manner. When the load signal LOADt from the selection control signal generation circuit 14 turns high, the data signals stored in the shift register 8 are latched by the latch circuit 9. Thus, the data signals for the light-emitting sections #a to #d are fed respectively to the AND gates G1a to G1d. Moreover, of the correction data signals for the light-emitting sections #a to #d that have previously been stored in sets of S (3) bits in the correction data storage circuit 10, those for the light-emitting section #a is fed to the AND gates Gxa to Gza, those for the light-emitting section #b is fed to the AND gates Gxb to Gzb, those for the light-emitting section #c is fed to the AND gates Gxc to Gzc, and those for the light-emitting section #d is fed to the AND gates Gxd to Gzd.

When the division timing signal DIV1 from the selection control signal generation circuit 14 turns high, the correction data signals for the light-emitting section #a that are fed to the AND gates Gxa to Gza are fed through the OR gates G2x to G2z to the AND gates G3x to G3z. In this state, when the strobe signal STB turns high, the data signal for the light-emitting section #a is fed through the AND gate G1a to the buffer B and to the AND gates G3x to G3z.

Thus, the data signal for the light-emitting section #a is fed through the buffer B to the current amplifier 12a, and the S (3) bit correction data signals are fed through the AND gates G3x to G3z to the current-amplifiers 12b to 12d. As a result, the current amplifier 12a is controlled according to the data signal for the light-emitting section #a, and the current-amplifiers 12b to 12d are controlled according to the correction data signals for the light-emitting section #a.

Likewise, when the division timing signal DIV2 from the selection control signal generation circuit 14 turns high, when the strobe signal STB turns high, the AND gates 1b selects and outputs the data signal for the light-emitting section #b, and the AND gates Gxb to Gzb and the OR gates G2x to G2z select and output the correction data signals for the light-emitting section #b. Thus, the current amplifier 12a is controlled according to the data signal for the light-emitting section #b, and the current-amplifiers 12b to 12d are controlled according to the correction data signals for the light-emitting section #b.

When the division timing signals DIV3 and DIV4 from the selection control signal generation circuit 14 respectively turn high, the selecting circuit 11 operates in similar manners. Thus, when the division timing signal DIV3 is high, the current amplifier 12a is controlled according to the data signal for the light-emitting section #c, and the current-amplifiers 12b to 12d are controlled according to the correction data signals for the light-emitting section #c; when the division timing signal DIV4 is high, the current amplifier 12a is controlled according to the data signal for the light-emitting section #d, and the current-amplifiers 12b to 12d are controlled according to the correction data signals for the light-emitting section #d.

Next, the selecting IC 2 will be described. As shown in FIG. 9, the drive circuit 3 switches whether or not to connect one of each of the group of output terminals CD1-1 to CD4-1, CD1-2 to CD4-2, . . . , and CD1-24 to CD4-24 individually to the ground potential VSS according to the division timing signals DIV4 to DIV1 from a selection control signal generation circuit 14a. Here, the selection control signal generation circuit 14a has largely the same circuit configuration as the selection control signal generation circuit 14 provided in the driving IC 1; specifically, it has the same configuration as the selection control signal generation circuit 14 shown in FIG. 8 except that the AND gate G5 is omitted.

Accordingly, the division timing signals DIV1 to DIV4 output from the selection control signal generation circuit 14a behave as shown in the timing chart of FIG. 7. When the division timing signal DIV1 is fed from the selection control signal generation circuit 14a, the output terminals CD4-1 to CD4-24 are selected and are connected to the ground potential VSS; when the division timing signal DIV2 is fed from the selection control signal generation circuit 14a, the output terminals CD3-1 to CD3-24 are selected and are connected to the ground potential VSS; when the division timing signal DIV3 is fed from the selection control signal generation circuit 14a, the output terminals CD2-1 to CD2-24 are selected and are connected to the ground potential VSS; when the division timing signal DIV4 is fed from the selection control signal generation circuit 14a, the output terminals CD1-1 to CD1-24 are selected and are connected to the ground potential VSS.

Next, the operation of the optical print head described above, including the operation of the driving IC 1 and the selecting IC 2 described above, will be described with reference to the timing chart shown in FIG. 10. Here, it is assumed that the correction data signals to be stored in the correction data storage circuit 10 have previously been stored therein.

First, a reset signal RESET is fed in, and this initializes the individual circuit blocks. Subsequently, a set signal SET is turned from low to high. This disables writing to the storage circuit 10. Data signals (7,296 of them) are sequentially fed to the data input terminal SI of the 19th driving IC 1, and those data signals are sequentially taken in by the shift register 8 of one driving IC 1 after another in synchronism with a clock signal CLK1.

Next, the load signal LOADt, produced on the basis of the control signal LOAD1, is held high for a predetermined time, and meanwhile the n×m (384) data signals held in the shift register 8 of each driving IC 1 are entered. At this time, the latch circuit 9 is selected (latched) on a trailing edge of the load signal LOADt, and accordingly the n×m (384) data signals taken in by the shift register 8 are fed to the latch circuit 9 and are stored therein.

On the other hand, immediately after the load signal LOAD1 turns from low to high, the division timing signal DIV1 turns from low to high and is then held high until the control signal LOAD1 rises from low to high next time. When the control signal LOAD1 rises from low to high next time, only the division timing signal DIV2 is turned high, and thereafter only the division timing signal DIV3, and then DIV4, is sequentially turned high.

As these division timing signals DIV1 to DIV4 are switched in this way, the positions at which the selecting circuit 11 selects and outputs data signals from the latch circuit 9 and from the correction data storage circuit 10 are sequentially switched. Moreover, as the division timing signals DIV1 to DIV4 are switched, the drive circuit 3 switches which of the output terminals CD4-1 to CD4-24, CD3-1 to CD3-24, CD2-1 to CD2-24, and CD1-1 to CD1-24 to connect to the ground voltage VSS.

Thus, the division timing signal DIV1 permits the first, fifth, . . . , and 7,293th data signals to be selected; the division timing signal DIV2 permits the second, sixth, . . . , and 7,294th data signals to be selected; the division timing signal DIV3 permits the third, seventh, . . . , and 7,295th data signals to be selected; and the division timing signal DIV4 permits the fourth, eighth, . . . , and 7,296th data signals to be selected.

During the period in which each of the division timing signals DIV1 to DIV4 is held high, the strobe signal STB, which indicates the lighting period, is held high for a predetermined period. While the strobe signal STB is held high, the aforementioned data signals (as necessary, the 3 bit correction data signals stored in the storage circuit 10 are added thereto) are fed to the drive circuit 12. The drive circuit 12, on the basis of the data signals and the correction data signals added thereto, selectively operates the four current amplifiers 12a to 12d so that their output currents are fed via the output terminals DO to the individual electrodes 23a of the light-emitting device 22.

Figure 10:
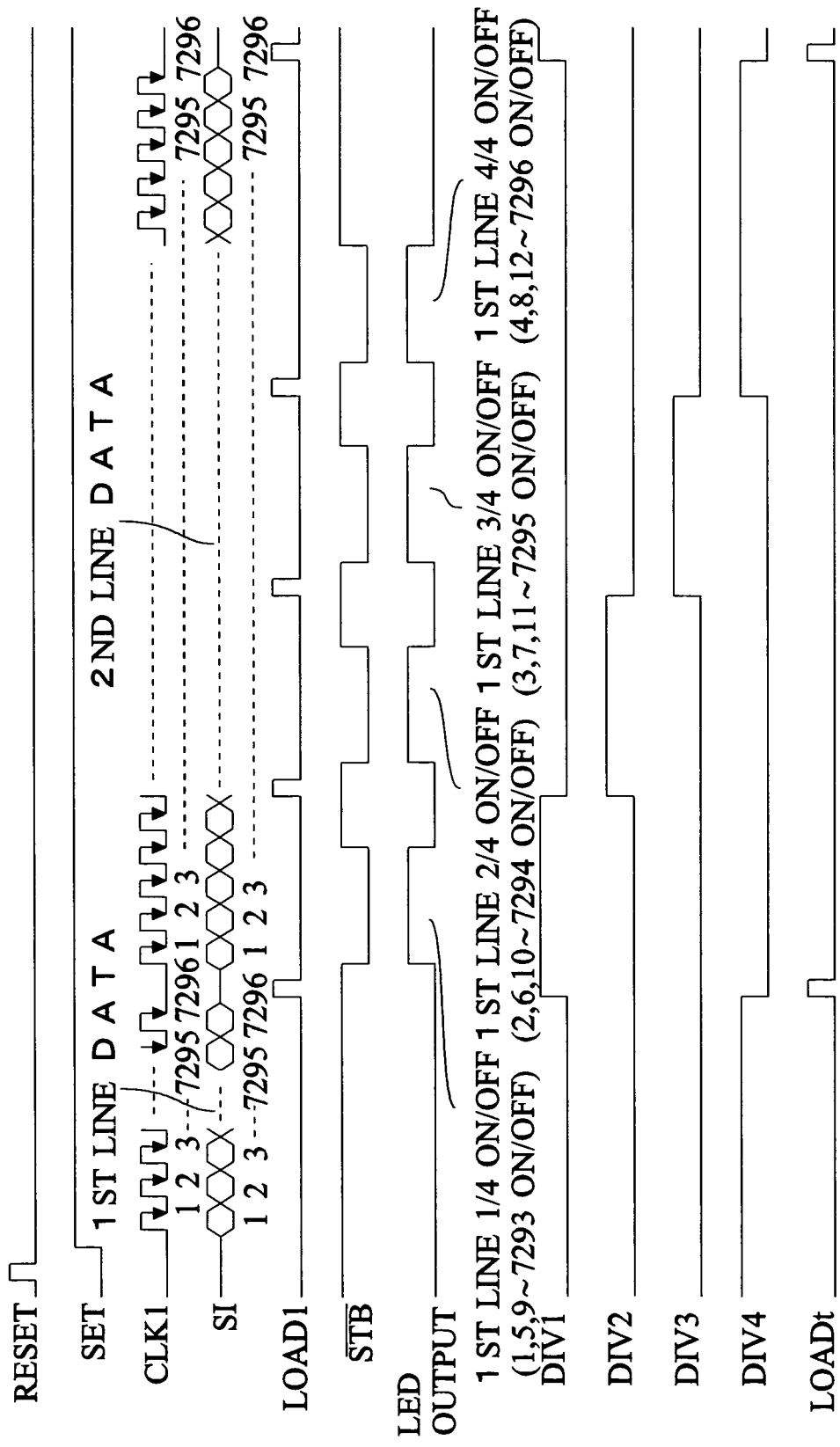
FIG. 10 is a timing chart showing the operation of the optical print head of the first embodiment.

Here, the strobe signal (inverted STB) may be one that is held at either a high or low level (in this example, low) during its active period as shown in FIG. 10, or may be one that indicates its active period with one or more alternating pulse signals that shift between a low and a high level during a short period.

Now, currents according to the data signals and correction data signals are ready to be fed to the individual electrodes 23a of all the light-emitting devices 22. However, as a result of the selection control performed by the drive circuit 3 of the selecting IC 2, only a quarter of the light-emitting sections 26 are grounded via the common electrodes 23b. Thus, in this example, only every fourth light-emitting section 26 is selectively lit.

The selected light-emitting sections 26 are lit for a predetermined period during which the strobe signal (inverted STB) remains low. Thus, by controlling the period during which the strobe signal (inverted STB) is held low, it is possible to control the time for which the light-emitting sections 26 are lit.

In this way, light emission for one line is achieved through time-division driving whereby a quarter of the light-emitting sections are selectively lit at a time, and by repeating this sequentially, it is possible to achieve exposure for one screen.

Second Embodiment

Figure 11:
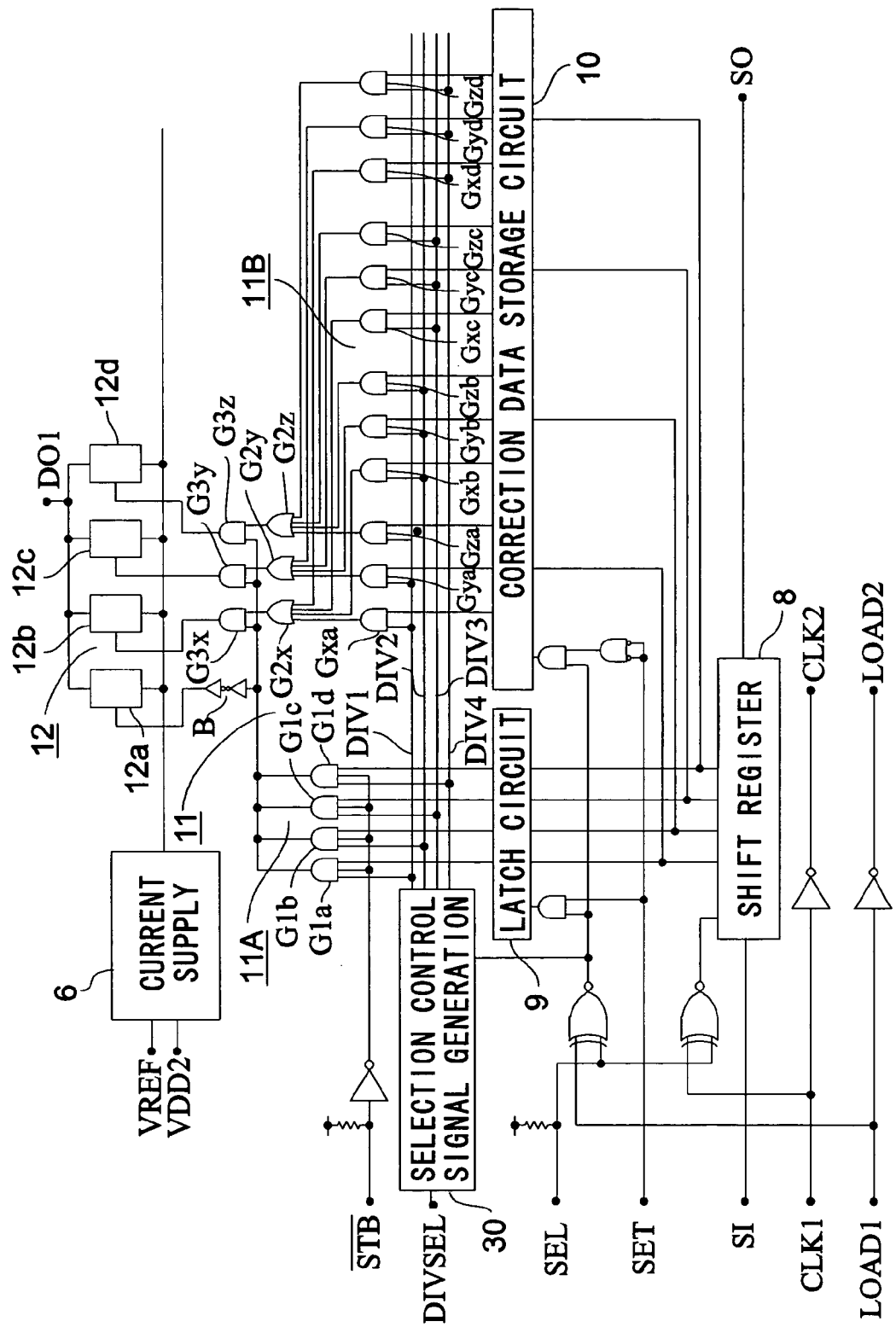
FIG. 11 is a block circuit diagram showing the internal configuration of the driving IC provided in the optical print head of a second embodiment of the invention.
Figure 14:
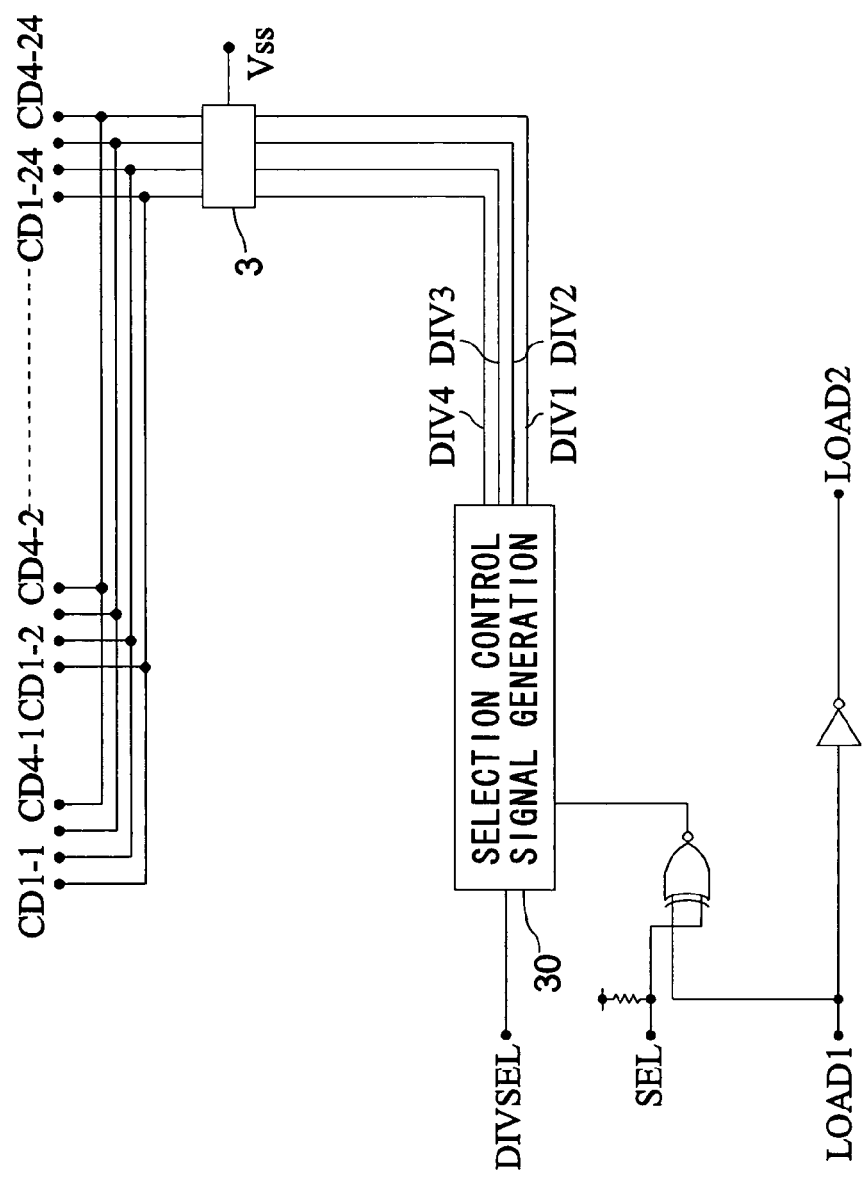
FIG. 14 is a block circuit diagram showing the internal configuration of the selecting IC provided in the optical print head of the second embodiment

A second embodiment of the optical print head configured as described earlier will be described with reference to the drawings. FIG. 11 is a circuit block diagram of a principal portion of the driving IC relating primarily to one DO1 of the output terminals DO1 to DO96 as extracted from the block diagram shown in FIG. 2. FIG. 14 is a circuit block diagram of a principal portion of the selecting IC as a more detailed version of the block diagram shown in FIG. 3.

The difference from the driving IC (FIG. 6) and the selecting IC (FIG. 9) used in the first embodiment is that a dedicated signal is used as the control signal that is fed to the selection control signal generation circuit. In other respects, the configurations shown in FIGS. 11 and 14 are the same as those shown in FIGS. 6 and 9. Accordingly, such circuit elements as are common to those figures are identified with the same reference numerals and symbols, and their explanations will not be repeated.

Figure 12:
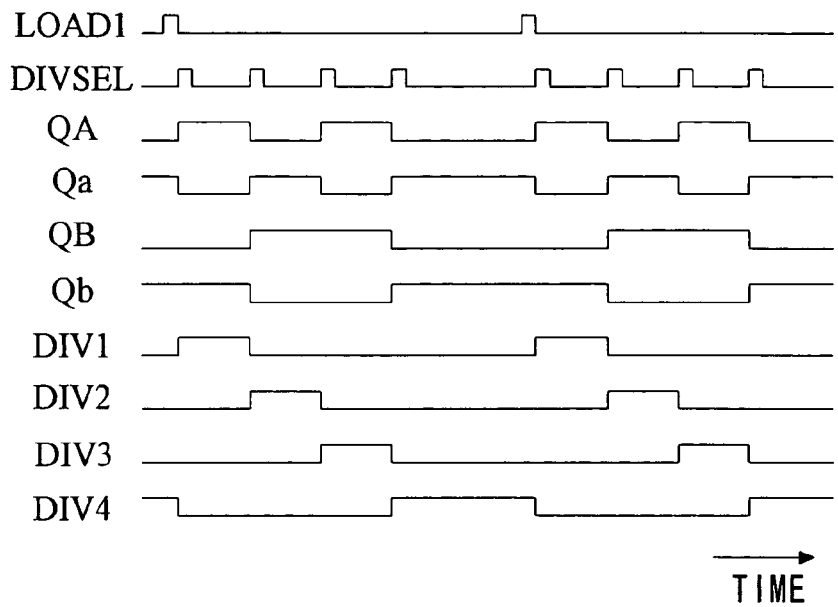
FIG. 12 is a timing chart showing the operation of the selection control signal generating circuit provided in the optical print head of the second embodiment.

FIG. 12 is a waveform diagram showing the operation of the selection control signal generation circuit 30. The control signal DIVSEL is a signal having nearly the same timing as the control signal LOAD1 used in the second embodiment and shown in FIG. 7. In this embodiment, the control signal LOAD1 is not used for the generation of the division timing signals DIV1 to DIV4, but is used to give the latch circuit 9 and the correction data storage circuit 10 the timing with which they take in data.

Figure 13:
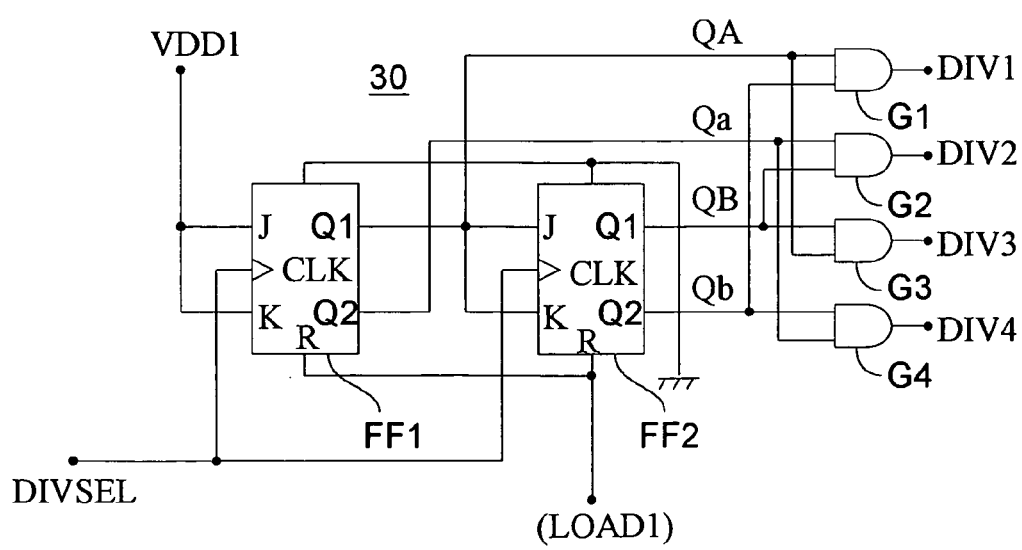
FIG. 13 is a block circuit diagram showing the internal configuration of the selection control signal generating circuit provided in the optical print head of the second embodiment.

FIG. 13 is a circuit diagram showing an example of the configuration of the selection control signal generation circuit 30. As shown in FIG. 12, the selection control signal generation circuit 30 is a circuit for generating the division timing signals DIV1 to DIV4 for dividing the period determined by the control signal DIVSEL into a plurality of periods. The selection control signal generation circuit 30 can be built as a counter composed of two flip-flops FF1 and FF2 and m (4) logic gate circuits G1 to G4.

Specifically, the JK flip-flop FF1 receives a supply voltage VDD1, which is at a high level, at its input terminals J and K, receives the control signal DIVSEL at its clock input terminal CL, and receives the control signal LOAD1 at its reset input terminal R. The flip-flop FF1 outputs a signal QA at its output terminal Q1, and outputs a signal Qa at its output terminal Q2. The JK flip-flop FF2 receives the signal QA at its input terminals J and K, receives the control signal DIVSEL at its clock input terminal CL, and receives the control signal LOAD1 at its reset input terminal R.

The flip-flop FF2 outputs a signal QB at its output terminal Q1, and outputs a signal Qb at its output terminal Q2. The logic gate circuit G1 outputs the AND of the signals QA and Qb as the division timing signal DIV1. The logic gate circuit G2 outputs the AND of the signals Qa and QB as the division timing signal DIV2. The logic gate circuit G3 outputs the AND of the signals QA and QB as the division timing signal DIV3. The logic gate circuit G4 outputs the AND of the signals Qa and Qb as the division timing signal DIV4.

As described above, the selection control signal generation circuit 30 generates the four division timing signals DIV1 to DIV4 from the single control signal DIVSEL. That is, the control signal DIVSEL can be fed in by way of fewer signal lines than there are division timing signals. This helps reduce the number of terminals for receiving control signals from outside and thereby miniaturize the ICs, and also helps reduce the number of wires for external connection such as wire-bonded wires.

As shown in FIGS. 11 and 14, the selection control signal generation circuit 30 configured as described above for generating the division timing signals DIV1 to DIV4 is provided in each of the driving IC 1 and the selecting IC 2.

Figure 15:
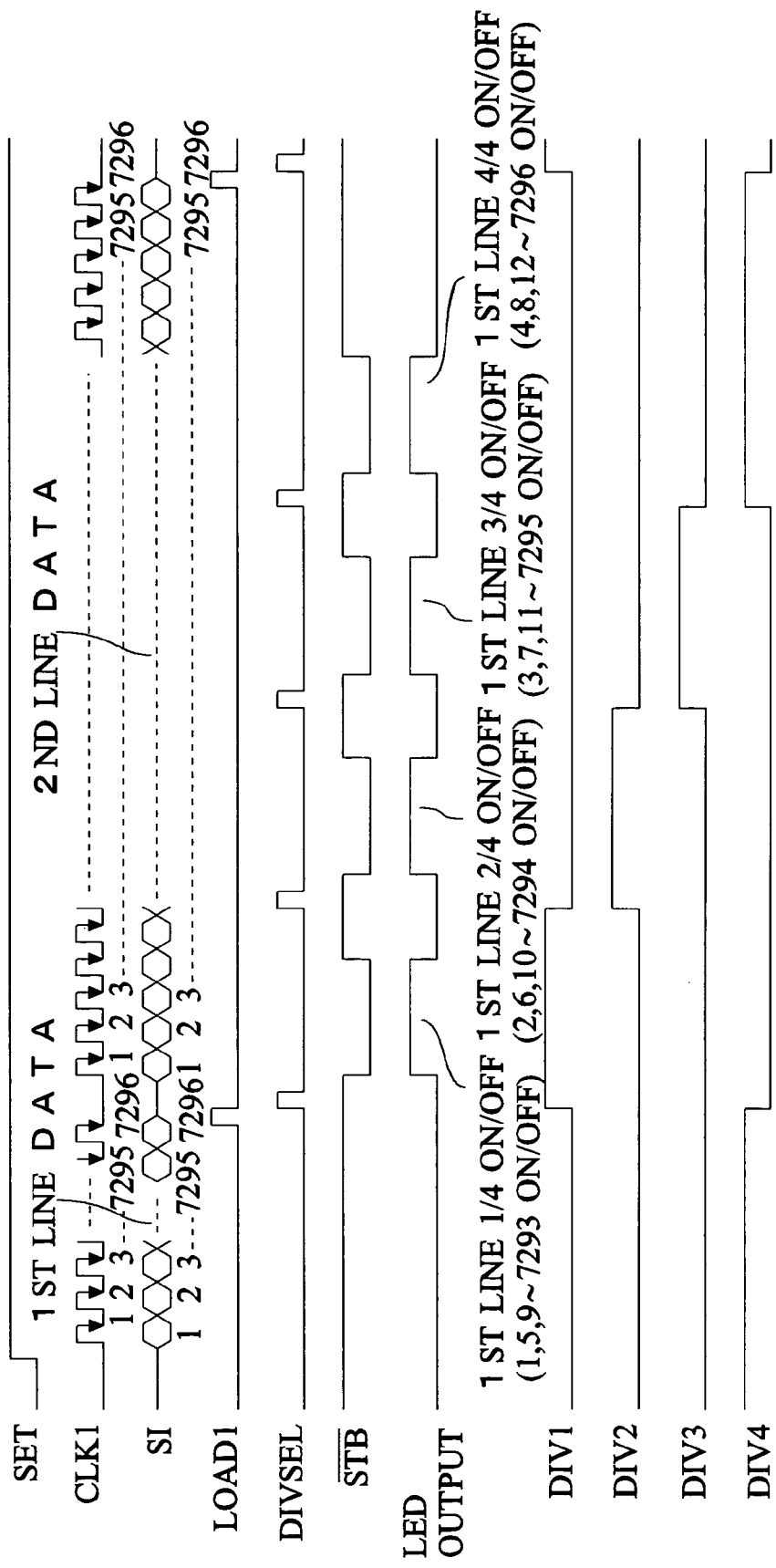
FIG. 15 is a timing chart showing the operation of the optical print head of the second embodiment.

Next, the operation of the optical print head described earlier, including the operation of the driving IC 1 and the selecting IC 2 described above, will be described with reference to the timing chart shown in FIG. 15. Here, it is assumed that the correction data signals to be stored in the correction data storage circuit 10 have previously been stored therein.

Data signals (7,296 of them) are sequentially fed to the data input terminal SI of the 19th driving IC 1, and those data signals are sequentially taken in by the shift register 8 of one driving IC 1 after another in synchronism with a clock signal CLK1. Next, the latch circuit 9 is selected (latched) on a trailing edge of the load signal LOAD1, and accordingly the n×m data signals taken in by the shift register 8 are fed to the latch circuit 9 and are stored therein.

On the other hand, immediately after the trailing edge of the control signal LOAD1, as a result of the control signal DIVSEL being held high for a predetermined time, the division timing signal DIV1 turns from low to high and is then held high until the control signal DIVSEL rises from low to high nest time. When the control signal DIVSEL rises from low to high next time, only the division timing signal DIV2 is turned high, and thereafter only the division timing signal DIV3, and then DIV4, is sequentially turned high.

As these division timing signals DIV1 to DIV4 are switched in this way, the positions at which the selecting circuit 11 selects and outputs data signals from the latch circuit 9 and from the correction data storage circuit 10 are sequentially switched. Moreover, as the division timing signals DIV1 to DIV4 are switched, the drive circuit 3 switches which of the output terminals CD4-1 to CD4-24, CD3-1 to CD3-24, CD2-1 to CD2-24, and CD1-1 to CD1-24 to connect to the ground voltage VSS.

Thus, the division timing signal DIV1 permits the first, fifth, . . . , and 7,293th data signals to be selected; the division timing signal DIV2 permits the second, sixth, . . . , and 7,294th data signals to be selected; the division timing signal DIV3 permits the third, seventh, . . . , and 7,295th data signals to be selected; and the division timing signal DIV4 permits the fourth, eighth, . . . , and 7,296th data signals to be selected.

Meanwhile, while the strobe signal STB is held high, the drive circuit 12, on the basis of the data signals and the correction data signals added thereto, selectively operates the four current amplifiers 12a to 12d so that their output currents are fed via the output terminals DO to the individual electrodes 23a of the light-emitting device 22. Moreover, the selection control performed by the drive circuit 3 of the selecting IC 2 permits only a quarter of the light-emitting sections 26 to be grounded via the common electrodes 23b. Thus, in this example, only every fourth light-emitting section 26 is selectively lit.

In this way, light emission for one line is achieved through time-division driving whereby a quarter of the light-emitting sections are selectively lit at a time, and by repeating this sequentially, it is possible to achieve exposure for one screen.

Third Embodiment

Figure 16:
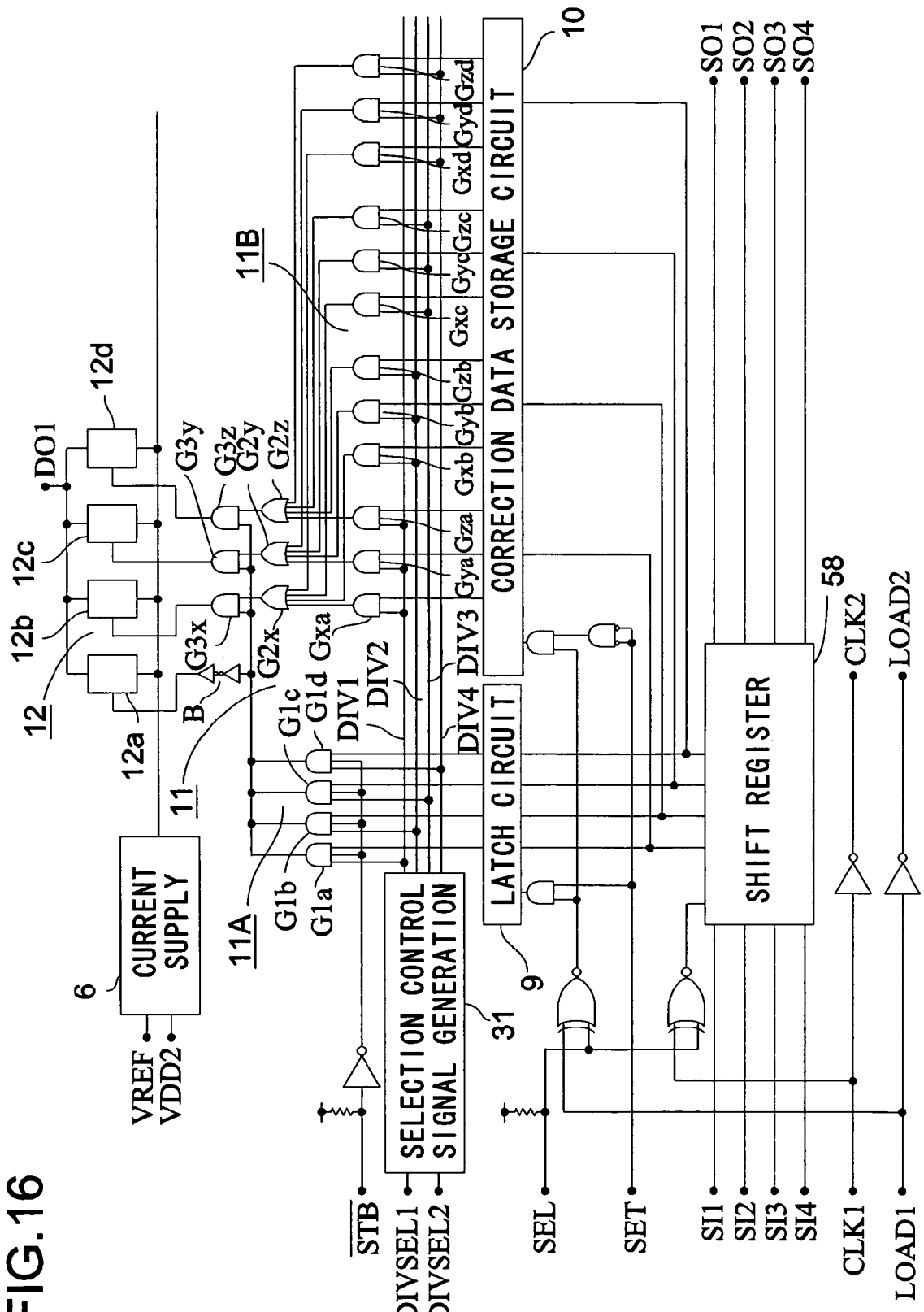
FIG. 16 is a block circuit diagram showing the internal configuration of the driving IC provided in the optical print head of a third embodiment of the invention.
Figure 18:
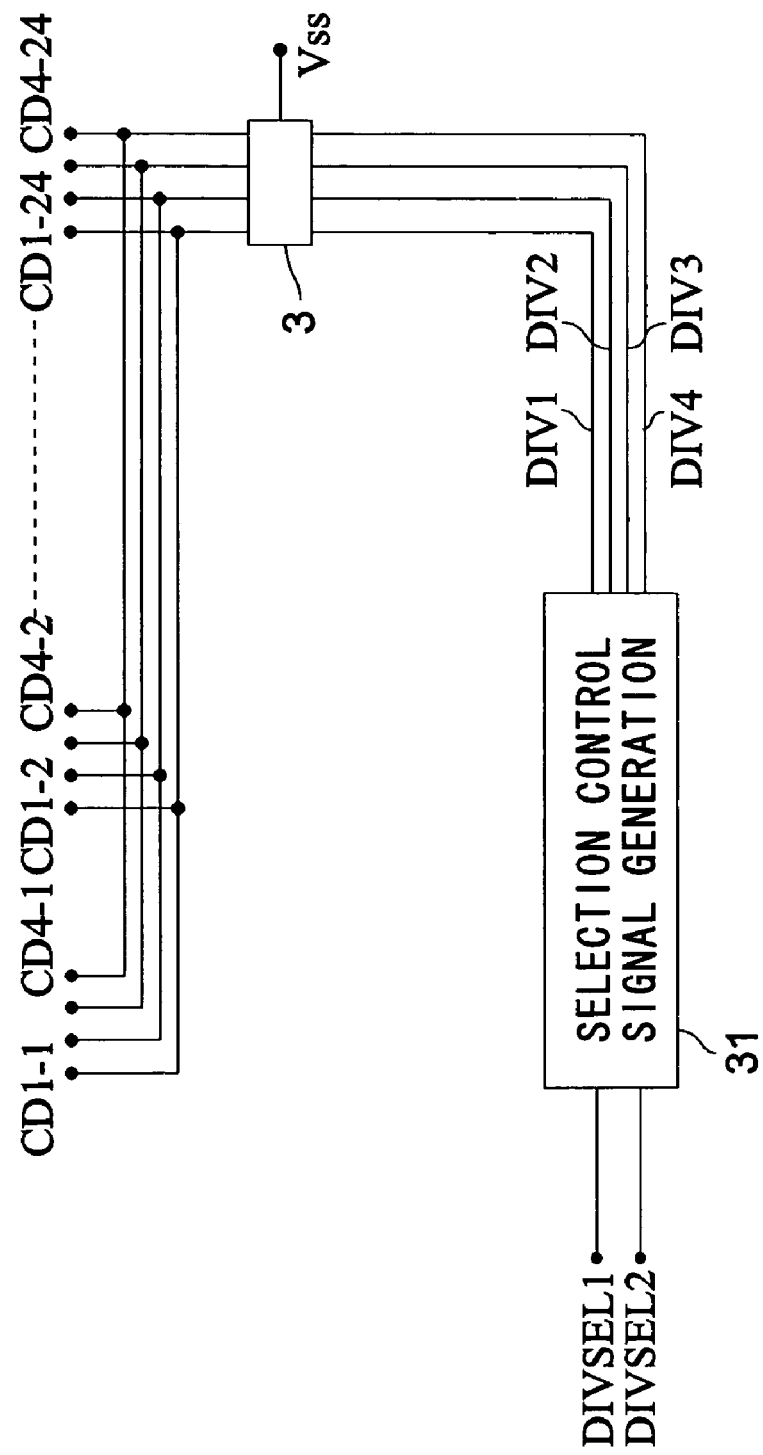
FIG. 18 is a block circuit diagram showing the internal configuration of the selecting IC provided in the optical print head of the third embodiment

A third embodiment of the optical print head configured as described earlier will be described with reference to the drawings. FIG. 16 is a circuit block diagram of a principal portion of the driving IC relating primarily to one DO1 of the output terminals DO1 to DO96 as extracted from the block diagram shown in FIG. 2. FIG. 18 is a circuit block diagram of a principal portion of the selecting IC as a more detailed version of the block diagram shown in FIG. 3.

The driving IC shown in FIG. 16 differs from the driving IC shown in FIG. 11 in that the data signal storage circuit has a multiple-input shift register of an n×m bit type that takes in data signals serially fed in via data input terminals SI1 to SI4 in synchronism with the clock signal CLK1 and that outputs the data signals serially via data output terminals SO1 to SO4, and in that the selection control signal generation circuit generates the division timing signals on the basis of two control signals DIVSEL1 and DIVSEL2 that are fed from outside to determine the timing of time division. Therefore, such circuit elements as are found also in FIG. 11 are identified with the same reference numerals and symbols, and their explanations will not be repeated.

The selecting IC shown in FIG. 18 differs from the selecting IC shown in FIG. 14 in that the selection control signal generation circuit generates the division timing signals on the basis of two control signals DIVSEL1 and DIVSEL2 that are fed from outside to determine the timing of time division. Therefore, such circuit elements as are found also in FIG. 14 are identified with the same reference numerals and symbols, and their explanations will not be repeated.

Figure 17:
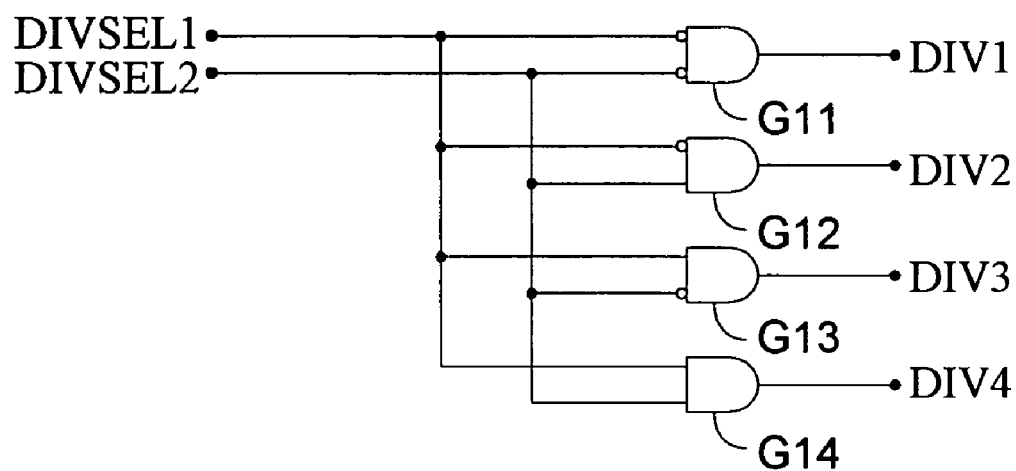
FIG. 17 is a block circuit diagram showing the internal configuration of the selection control signal generating circuit provided in the optical print head of the third embodiment.

As shown in FIG. 17, in the selection control signal generation circuit 31 provided in the driving IC 1 shown in FIG. 16 and in the selecting IC 2 shown in FIG. 18, a logic gate circuit G11 outputs the AND of the inversion of the control signal DIVSEL1 and the inversion of the control signal DIVSEL2 as the division timing signal DIV1. A logic gate circuit G12 outputs the AND of the inversion of the control signal DIVSEL1 and the control signal DIVSEL2 as the division timing signal DIV2. A logic gate circuit G13 outputs the AND of the control signal DIVSEL1 and the inversion of the control signal DIVSEL2 as the division timing signal DIV3. A logic gate circuit G14 outputs the AND of the control signal DIVSEL1 and the control signal DIVSEL2 as the division timing signal DIV4.

TABLE 1

| DIVSEL1 | DIVSEL2 | Selected |
|---------|---------|----------|
| L | L | DIV1 |
| L | H | DIV2 |
| H | L | DIV3 |
| H | H | DIV4 |

Accordingly, as shown in the truth table in Table 1, when the control signal DIVSEL1 is high and the control signal DIVSEL2 is high, the selection control signal generation circuit 31 turns only the division timing signal DIV4 high and keeps the other division timing signals DIV1 to DIV3 low. When the control signal DIVSEL1 is high and the control signal DIVSEL2 is low, the selection control signal generation circuit 31 turns only the division timing signal DIV3 high and keeps the other division timing signals DIV1, DIV2, and DIV4 low.

When the control signal DIVSEL1 is low and the control signal DIVSEL2 is high, the selection control signal generation circuit 31 turns only the division timing signal DIV2 high and keeps the other division timing signals DIV1, DIV3, and DIV4 low. When the control signal DIVSEL1 is low and the control signal DIVSEL2 is low, the selection control signal generation circuit 31 turns only the division timing signal DIV1 high and keeps the other division timing signals DIV2 to DIV4 low. In this way, by giving the control signals DIVSEL1 and DIVSEL2 different combinations of levels, it is possible to freely select which group to drive on the basis of the division timing signals DIV1 and DIV4.

As shown in FIGS. 16 and 18, the selection control signal generation circuit 31 configured as described above for generating the division timing signals DIV1 to DIV4 is provided in each of the driving IC 1 and the selecting IC 2.

Figure 19:
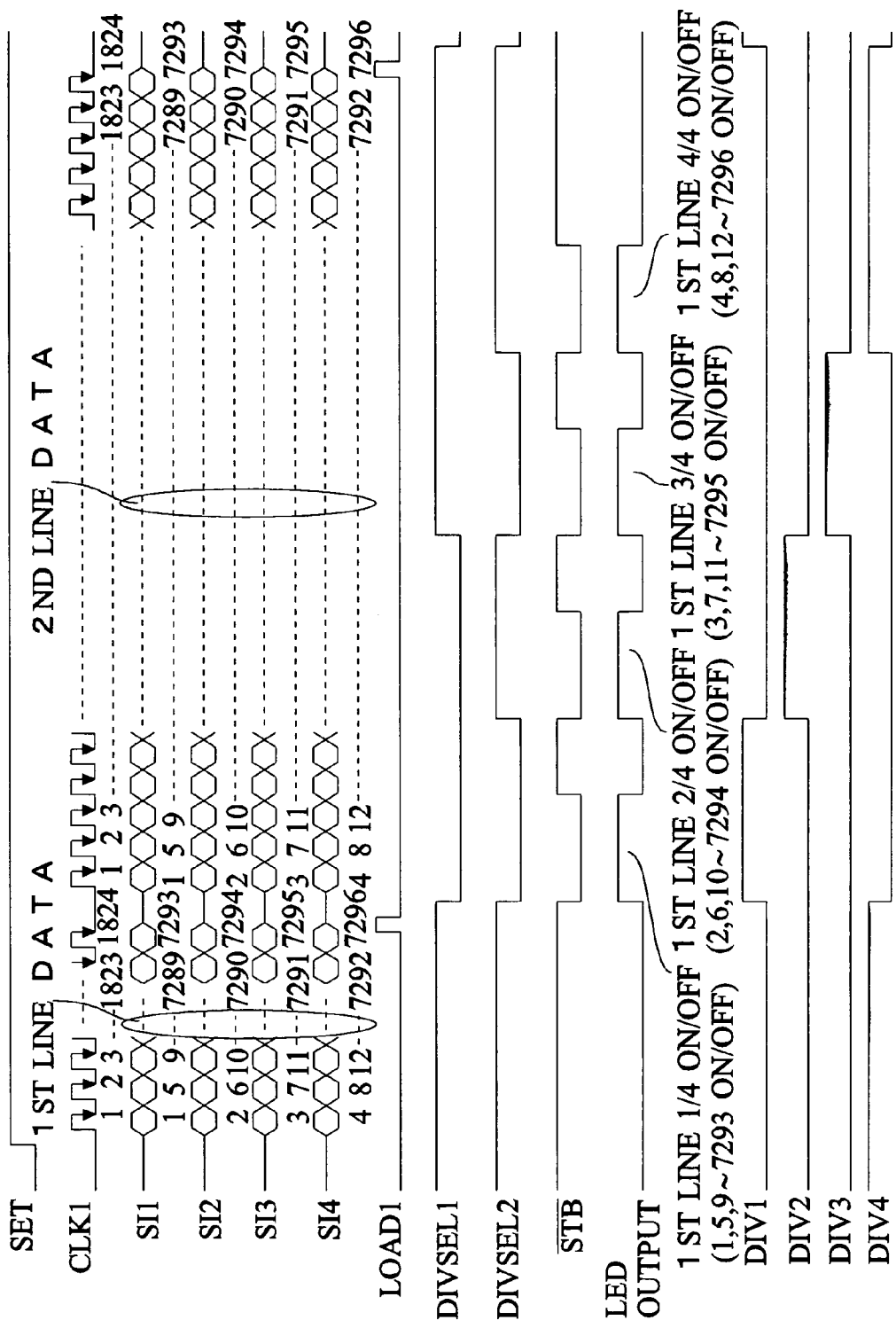
FIG. 19 is a timing chart showing the operation of the optical print head of the third embodiment.
Figure 20:
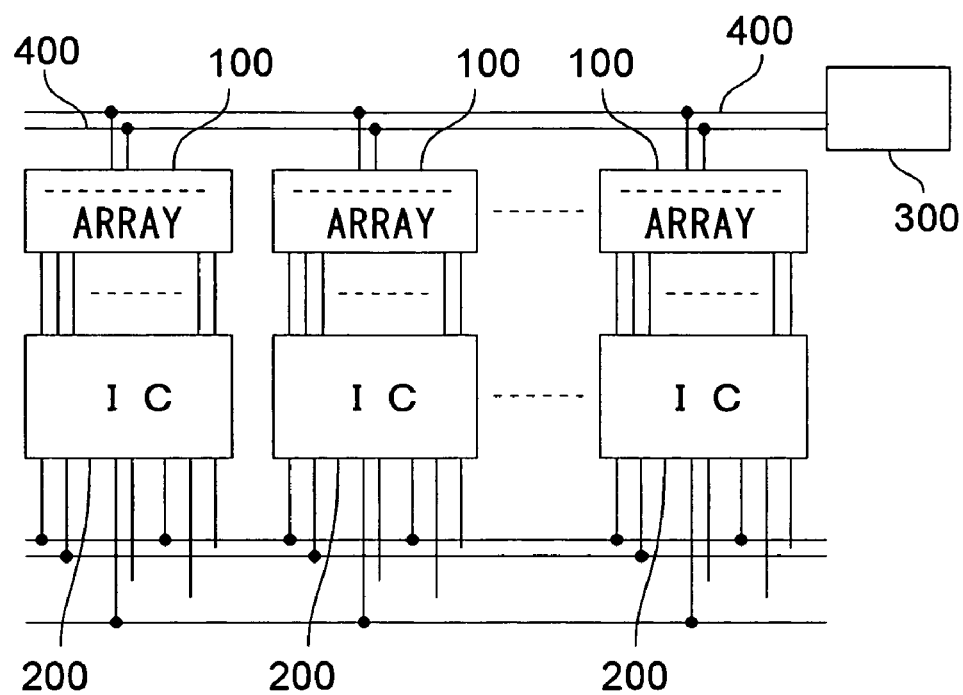
FIG. 20 is a block diagram showing the internal configuration of a conventional optical print head.
Figure 21:
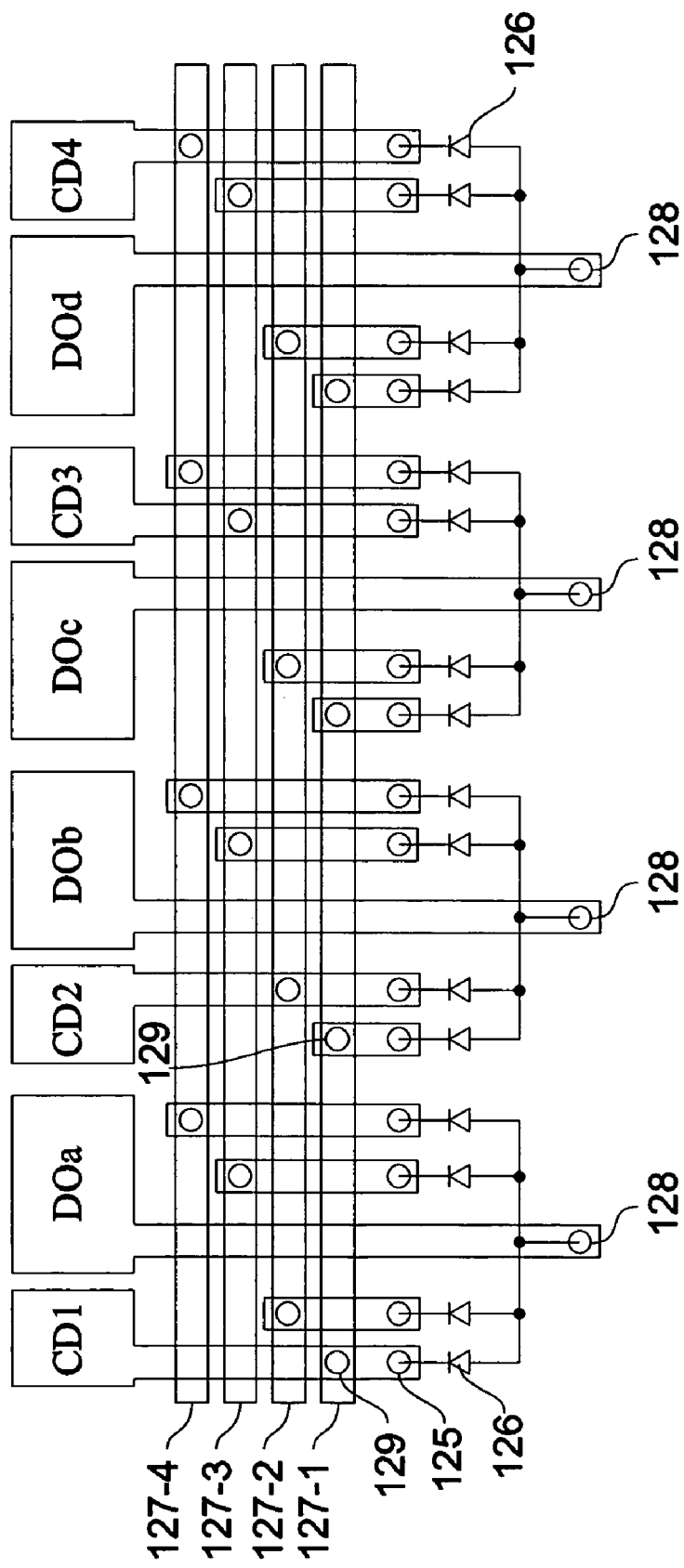
FIG. 21 is a plan view of a principal portion of and around a light-emitting device in a conventional optical print head.
Figure 22:
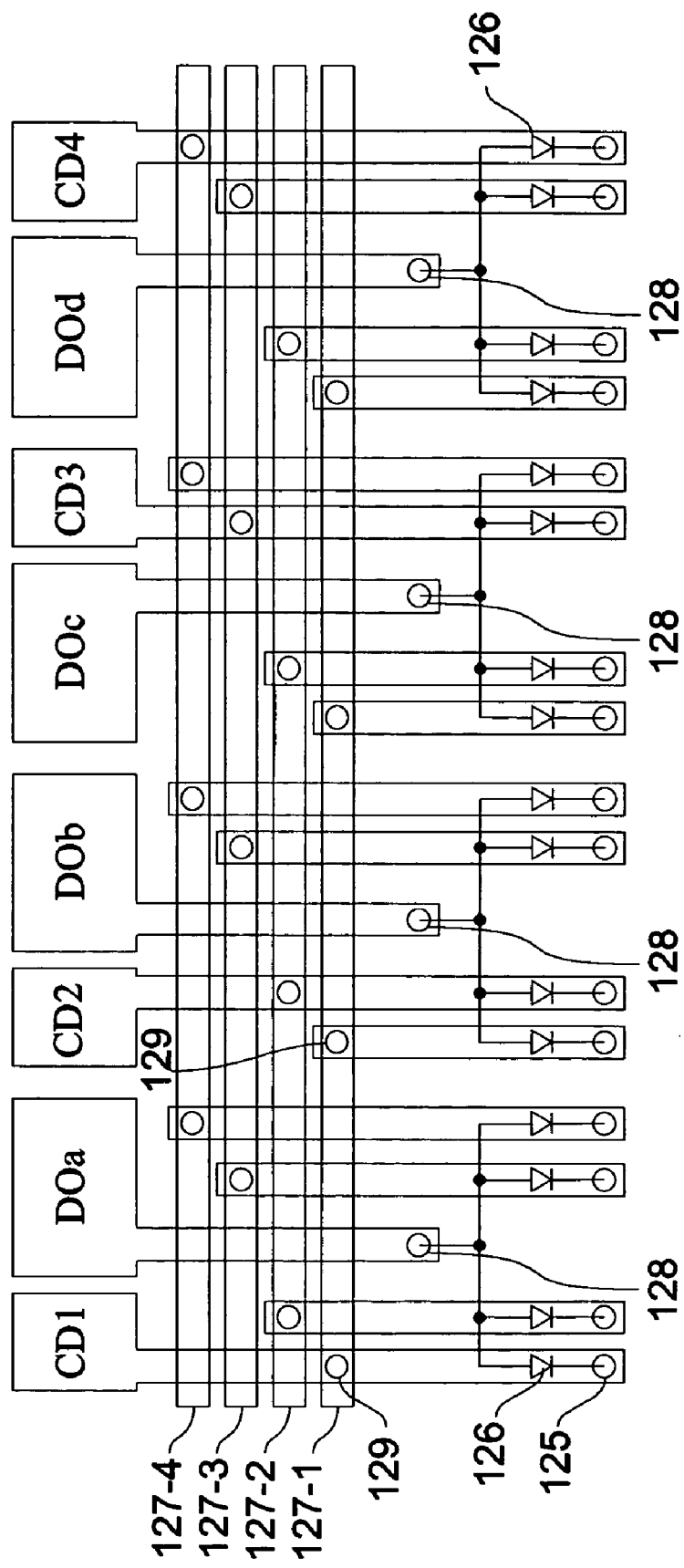
FIG. 22 is a plan view of a principal portion of and around a light-emitting device in a conventional optical print head.

Next, the operation of the optical print head described earlier, including the operation of the driving IC 1 and the selecting IC 2 described above, will be described with reference to the timing chart shown in FIG. 19. Here, it is assumed that the correction data signals to be stored in the correction data storage circuit 10 have previously been stored therein.

First, a set signal SET is turned from low to high. This disables writing to the storage circuit 10. Data signals (7,296 of them) are fed sequentially, in groups of r (4), to the data input terminals SI1 to SI4 of the 19th driving IC 1, and those data signals are sequentially taken in by the shift register 8 of one driving IC 1 after another in synchronism with a clock signal CLK1.

Here, the data signals that are fed to the input terminals SI1 to SI4 are fed in in a form divided in advance so as to correspond to the four groups of light-emitting sections; specifically, the first, fifth, ninth . . . data signals are fed to the input terminals SI1, the second, sixth, tenth . . . data signals are fed to the input terminals SI2, and so forth. When the input of data signals to the shift register 58 of one driving IC 1 is complete, the data signals are fed, via the output terminals SO1 to SO4 thereof, to the shift register 58 of the adjacent driving IC 1. Inputting the data signals via multiple paths in this way helps greatly reduce the time required to input the data signals as compared with a case where they are input via a single path.

When the input of data signals corresponding to one line is complete, the load signal LOAD1 is held high for a predetermined time so that the n×m (384) data signals held in the shift registers 58 of the individual driving ICs 1 are entered. Here, the latch circuit 9 is selected (latched) on a trailing edge of the load signal LOAD1, and therefore the n×m (384) data signals taken in by the shift register 58 are fed to the latch circuit 9 and are stored therein.

Immediately after the load signal LOAD1 turns from high to low, the control signals DIVSEL1 and DIVSEL2, which indicate the timing of lighting, are both held low. As a result, of the division timing signals output from the selection control signal generation circuit 14, only DIV1 turns from low to high. Immediately thereafter, the strobe signal (inverted STB), which indicates the timing of lighting, turns from high to low and is then held low for a predetermined period, and meanwhile the light-emitting sections are selectively lit.

By changing how the control signals DIVSEL1 and DIVSEL2 are combined, it is then possible to turn only the division timing signal DIV2 high. Likewise, it is thereafter possible to turn only one of DIV3 and DIV4 high at a time sequentially.

As these division timing signals DIV1 to DIV4 are switched in this way, the positions at which the selecting circuit 11 selects and outputs data signals from the latch circuit 9 and from the correction data storage circuit 10 are sequentially switched. Moreover, as the division timing signals DIV1 to DIV4 are switched, the drive circuit 3 switches which of the output terminals CD4-1 to CD4-24, CD3-1 to CD3-24, CD2-1 to CD2-24, and CD1-24 to connect to the ground voltage VSS.

In this way, as in the first and second embodiments, by the use of division timing signals DIV1 to DIV4, light emission for one line is achieved through time-division driving whereby a quarter of the light-emitting sections are selectively lit at a time, and by repeating this sequentially, it is possible to achieve exposure for one screen.

The selecting IC provided in the optical print head described above is provided with, for each of m groups, n/m output terminals that are connected to the common electrodes. There may be provided, however, any other number of those output terminals than n/m, so long as there are provided more than one of them. In that case, the selecting IC is provided with, for each of m groups, x output terminals, and thus has m×x output terminals in total.

INDUSTRIAL APPLICABILITY

According to the present invention, there are provided, separately from driving ICs, a plurality of selecting ICs for selecting common electrodes. This eliminates the need for a number of long conductors as required conventionally, and thus helps prevent a voltage drop resulting from insufficient current capacity. This helps prevent the differences in brightness among individual light-emitting sections from growing according to the number of light-emitting sections lit. Moreover, by giving the selecting ICs a plurality of output terminals that are connected to the common electrodes, it is possible to distribute the currents that flow through the common electrodes. This helps prevent differences in brightness among the light-emitting sections depending on their positions. Moreover, by arranging the driving ICs and the selecting ICs on both sides of light-emitting devices, it is possible to lower the wiring density. Furthermore, the selecting ICs for selecting common electrodes are provided separately from the driving ICs. This helps prevent the heat generated by the selecting ICs from affecting the driving ICs, and thus helps stabilize their operation.

The invention claimed is:

1. An optical print head comprising:
a light-emitting device having m groups of n light-emitting sections so as to permit time-division driving, each group of n light-emitting sections comprising a light emitting section from each group of m mutually adjacent light-emitting sections, wherein the light-emitting section from each group of m mutually adjacent group light-emitting sections has the same relative position within each group of m mutually adjacent light-emitting sections, the light-emitting device being arrayed in one row on a substrate;
a driving IC, having n device driving output terminals, for feeding drive currents via the device driving output terminals to first electrodes of the light-emitting sections, each device driving output terminal being connected to a different group of m mutually adjacent light-emitting sections, the driving IC being arrayed in one row on the substrate; and
a selecting IC, having x x m group selection terminals of which x are provided for each group of n light-emitting sections, for feeding supply potentials via the group selection terminals to second electrodes of the n light-emitting sections, each group selection terminal being connected to a different group of n light-emitting sections, the selecting IC being arrayed in one row on the substrate,
wherein the driving IC and the selecting IC are arranged in a pair with the light-emitting device placed in between, and
wherein time-division driving is achieved through driving at m divided times as a result of
the driving IC feeding the drive currents to the light-emitting device in such a way that n light-emitting sections belonging to one group at a time receive respective drive currents via n device driving output terminals according to n data signals corresponding to those light-emitting sections and
the selecting IC feeding the supply potentials to the light-emitting device in such a way that n light-emitting sections belonging to one group at a time receive n supply potential potentials via x group selection terminals.

2. An optical print head as claimed in claim 1, wherein a plurality of sets of the light-emitting device, driving IC, and selecting IC are arranged in one direction in such a way as to show a one-to-one-to-one correspondence.

3. An optical print head as claimed in claim 2, wherein timing with which the driving IC switches where to feed the driving currents from one group of n light-emitting sections to another is synchronous with timing with which the selecting IC switches where to feed the supply potential from one group of n light-emitting sections to another.

4. An optical print head as claimed in claim 3, wherein the driving IC comprises a timing control circuit for generating a division timing signal that determines the timing with which the driving IC switches where to feed the driving currents from one group of n light-emitting sections to another,
wherein the selecting IC comprises a timing control circuit for generating a division timing signal that determines the timing with which the selecting IC switches where to feed the supply potential from one group of u light-emitting sections to another, and
wherein the timing control circuit provided in the driving IC and the timing control circuit provided in the selecting IC generate a same division timing signal from a same timing signal.

5. An optical print head as claimed in claim 4, wherein the driving IC comprises:
a data signal storage circuit for storing at least n×m data signals fed sequentially from outside;
a data selecting circuit for dividing the data signals stored in the data signal storage circuit into m groups so as to extract data signals belonging to one group of n light-emitting sections at a time; and
a drive circuit for feeding drive currents to the output terminals according to the data signals extracted by the data selecting circuit.

6. An optical print head as claimed in claim 5, wherein the driving IC further comprises:
a correction data storage circuit for storing correction data with which the data signals are individually corrected.

7. An optical print head as claimed in claim 6, wherein the selecting IC comprises:
a drive circuit for selecting x of the group selection terminals corresponding to one group of n light-emitting sections at a time so as to electrically connect those group selection terminals to the supply potential.

8. An optical print head as claimed in claim 7,
wherein n/m of the group selection terminals of the selecting IC are provided for each group of n light-emitting sections, and there are n of the group selection terminals in total.

9. An optical print head as claimed in claim 1,
wherein timing with which the driving IC switches where to feed the driving currents from one group of n light-emitting sections to another is synchronous with timing with which the selecting IC switches where to feed the supply potential from one group of n light-emitting sections to another.

10. An optical print head as claimed in claim 9, wherein the driving IC comprises a timing control circuit for generating a division timing signal that determines the timing with which the driving IC switches where to feed the driving currents from one group of n light-emitting sections to another, wherein the selecting IC comprises a timing control circuit for generating a division timing signal that determines the timing with which the selecting IC switches where to feed the supply potential from one group of n light-emitting sections to another, and wherein the timing control circuit provided in the driving IC and the timing control circuit provided in the selecting IC generate a same division timing signal from a same timing signal.

11. An optical print head as claimed in claim 1, wherein the driving IC comprises:

a data signal storage circuit for storing at least n×m data signals fed sequentially from outside;

a data selecting circuit for dividing the data signals stored in the data signal storage circuit into m groups so as to extract data signals belonging to one group of n light-emitting sections at a time; and a drive circuit for feeding drive currents to the output terminals according to the data signals extracted by the data selecting circuit.

12. An optical print head as claimed in claim 11, wherein the driving IC further comprises:

a correction data storage circuit for storing correction data with which the data signals are individually corrected.

13. An optical print head as claimed in claim 1, wherein the selecting IC comprises:

a drive circuit for selecting x of the group selection terminals corresponding to one group of n light-emitting sections at a time so as to electrically connect those group selection terminals to the supply potential.

14. An optical print head as claimed in claim 13, wherein n/m of the group selection terminals of the selecting IC are provided for each group of n light-emitting sections, and there are n of the output terminals in total.

* * * * *